US008600654B2

(12) United States Patent
Kishikawa et al.

(10) Patent No.: US 8,600,654 B2
(45) Date of Patent: Dec. 3, 2013

(54) DATA STRUCTURE OF ROUTE GUIDANCE DATABASE

(75) Inventors: Kiyonari Kishikawa, Fukuoka (JP); Eiji Teshima, Fukuoka (JP); Masatoshi Aramaki, Fukuoka (JP); Hideyuki Shimozuru, Fukuoka (JP); Masaya Ada, Fukuoka (JP); Tatsuji Kimura, Fukuoka (JP); Satomi Baba, Fukuoka (JP); Kouhei Tou, Fukuoka (JP); Toru Irie, Fukuoka (JP)

(73) Assignee: GEO Technical Laboratory Co., Ltd., Fukuoka (JP)

( * ) Notice: Subject to any disclaimer, the term of this patent is extended or adjusted under 35 U.S.C. 154(b) by 526 days.

(21) Appl. No.: 12/677,506

(22) PCT Filed: Oct. 21, 2008

(86) PCT No.: PCT/JP2008/069027
§ 371 (c)(1),
(2), (4) Date: Oct. 7, 2010

(87) PCT Pub. No.: WO2009/096074
PCT Pub. Date: Aug. 6, 2009

(65) Prior Publication Data
US 2011/0054783 A1    Mar. 3, 2011

(30) Foreign Application Priority Data
Jan. 28, 2008    (JP) .................................. 2008-016462

(51) Int. Cl.
G01C 21/00    (2006.01)
(52) U.S. Cl.
USPC ........... 701/209; 701/400; 701/409; 701/430; 340/995.1; 340/995.14; 340/995.18; 340/995.19

(58) Field of Classification Search
None
See application file for complete search history.

(56) References Cited

U.S. PATENT DOCUMENTS 5,638,279 A *  6/1997  Kishi et al. .................... 701/437
5,974,876 A *  11/1999  Hijikata et al. ............. 73/178 R
(Continued)

FOREIGN PATENT DOCUMENTS

JP    09-329452    12/1997
JP    11-108679    4/1999
(Continued)

OTHER PUBLICATIONS

Supplementary Search Report dated Aug. 24, 2010 for European Application No. 08871914.1.

(Continued)

*Primary Examiner* — Jonathan M Dager
(74) *Attorney, Agent, or Firm* — Beyer Law Group LLP

(57) ABSTRACT

A route guidance device is provided with a two-dimensional road network for a route search, a three-dimensional road network for a route guidance, and guiding line shape data. The guiding line shape data is three-dimensional guidance display data for guiding an operator to go straight through, or to make a right turn, left turn, etc. at intersections in accordance with a passage mode, or to switch lanes before entering an intersection. A link node of the two-dimensional road network is associated with the guiding line shape data through the three-dimensional road network. The route search uses the two-dimensional road network, and the route guidance uses the guiding line shape data associated with the link node acquired by the route search. The present invention can realize an instinctively understandable route guidance that follows a passage mode without increasing a load of a route search.

15 Claims, 23 Drawing Sheets

(56) References Cited

U.S. PATENT DOCUMENTS

| | | | |
|---|---|---|---|
| 6,006,161 A * | 12/1999 | Katou | 701/410 |
| 6,128,573 A * | 10/2000 | Nomura | 701/428 |
| 6,182,010 B1 * | 1/2001 | Berstis | 701/441 |
| 6,285,317 B1 * | 9/2001 | Ong | 342/357.57 |
| 6,321,160 B1 * | 11/2001 | Takahashi | 701/410 |
| 6,324,469 B1 * | 11/2001 | Okude et al. | 701/532 |
| 6,356,840 B2 * | 3/2002 | Kusama | 701/437 |
| 6,360,168 B1 * | 3/2002 | Shimabara | 701/436 |
| 6,415,222 B1 | 7/2002 | Sato et al. | |
| 6,587,784 B1 * | 7/2003 | Okude et al. | 701/454 |
| 6,591,190 B2 * | 7/2003 | Nishida et al. | 701/532 |
| 6,611,753 B1 * | 8/2003 | Millington | 701/436 |
| 6,710,774 B1 * | 3/2004 | Kawasaki et al. | 345/419 |
| 6,871,143 B2 * | 3/2005 | Fujiwara | 701/533 |
| 6,999,075 B2 * | 2/2006 | Kumagai | 345/420 |
| 7,383,126 B2 * | 6/2008 | Takahashi | 701/437 |
| 7,508,400 B2 | 3/2009 | Fuki et al. | |
| 7,590,487 B2 * | 9/2009 | De Silva | 701/436 |
| 7,698,063 B2 * | 4/2010 | Kim | 701/437 |
| 7,765,055 B2 * | 7/2010 | Cera et al. | 701/117 |
| 7,920,966 B2 * | 4/2011 | Emoto et al. | 701/436 |
| 7,930,101 B2 * | 4/2011 | Geelen et al. | 701/436 |
| 7,941,269 B2 * | 5/2011 | Laumeyer et al. | 701/523 |
| 7,974,781 B2 * | 7/2011 | Emoto et al. | 701/436 |
| 7,990,394 B2 * | 8/2011 | Vincent et al. | 345/629 |
| 8,099,233 B2 * | 1/2012 | Matsuno et al. | 701/436 |
| 8,108,142 B2 * | 1/2012 | Dupont et al. | 701/420 |
| 8,121,353 B2 * | 2/2012 | Kim et al. | 382/113 |
| 8,195,386 B2 * | 6/2012 | Hu et al. | 701/436 |
| 8,260,543 B2 * | 9/2012 | Han | 701/409 |
| 8,280,105 B2 * | 10/2012 | Kishikawa et al. | 382/103 |
| 8,301,372 B2 * | 10/2012 | Herbst et al. | 701/433 |
| 8,326,530 B2 * | 12/2012 | Asai et al. | 701/438 |
| 8,335,645 B2 * | 12/2012 | Sakamoto | 701/440 |
| 2001/0028350 A1 * | 10/2001 | Matsuoka et al. | 345/427 |
| 2002/0038181 A1 * | 3/2002 | Okude et al. | 701/208 |
| 2002/0123841 A1 * | 9/2002 | Satoh et al. | 701/208 |
| 2003/0160867 A1 * | 8/2003 | Ohto et al. | 348/135 |
| 2004/0049341 A1 * | 3/2004 | Fujiwara | 701/210 |
| 2005/0004749 A1 * | 1/2005 | Park | 701/200 |
| 2005/0052462 A1 * | 3/2005 | Sakamoto et al. | 345/473 |
| 2005/0102095 A1 * | 5/2005 | Vanegas et al. | 701/200 |
| 2005/0116964 A1 * | 6/2005 | Kotake et al. | 345/629 |
| 2005/0149262 A1 * | 7/2005 | Oikubo | 701/211 |
| 2005/0154505 A1 * | 7/2005 | Nakamura et al. | 701/1 |
| 2005/0209776 A1 * | 9/2005 | Ogino | 701/211 |
| 2005/0234638 A1 * | 10/2005 | Ogaki et al. | 701/209 |
| 2005/0273256 A1 * | 12/2005 | Takahashi | 701/211 |
| 2006/0004512 A1 * | 1/2006 | Herbst et al. | 701/208 |
| 2006/0155466 A1 * | 7/2006 | Kanda et al. | 701/209 |
| 2006/0178818 A1 * | 8/2006 | Dhollande | 701/209 |
| 2006/0190812 A1 * | 8/2006 | Ellenby et al. | 715/512 |
| 2006/0238383 A1 * | 10/2006 | Kimchi et al. | 340/995.1 |
| 2006/0284879 A1 * | 12/2006 | Nagata et al. | 345/582 |
| 2007/0005233 A1 * | 1/2007 | Pinkus et al. | 701/200 |
| 2007/0057948 A1 * | 3/2007 | Nomura | 345/441 |
| 2007/0150179 A1 * | 6/2007 | Pinkus et al. | 701/208 |
| 2007/0233380 A1 * | 10/2007 | Tanaka | 701/211 |
| 2008/0147325 A1 * | 6/2008 | Maassel et al. | 702/5 |
| 2008/0238933 A1 * | 10/2008 | Wako | 345/617 |
| 2009/0080697 A1 | 3/2009 | Kishikawa et al. | |
| 2009/0207170 A1 * | 8/2009 | Matsunaga | 345/427 |
| 2009/0222203 A1 * | 9/2009 | Mueller | 701/211 |
| 2009/0240426 A1 * | 9/2009 | Akita et al. | 701/201 |
| 2010/0070162 A1 * | 3/2010 | Aihara | 701/201 |

FOREIGN PATENT DOCUMENTS

| | | |
|---|---|---|
| JP | 11-271070 | 10/1999 |
| JP | 2002-257576 | 9/2002 |
| JP | 2005-321370 | 11/2005 |
| JP | 2005-345225 | 12/2005 |
| WO | WO 2007/111062 A1 | 10/2007 |

OTHER PUBLICATIONS

International Search Report dated Jan. 13, 2009 from International Application No. PCT/JP2008/069027.

Office Action dated Feb. 9, 2012 from Japanese Patent Application No. 2008-016462.

* cited by examiner

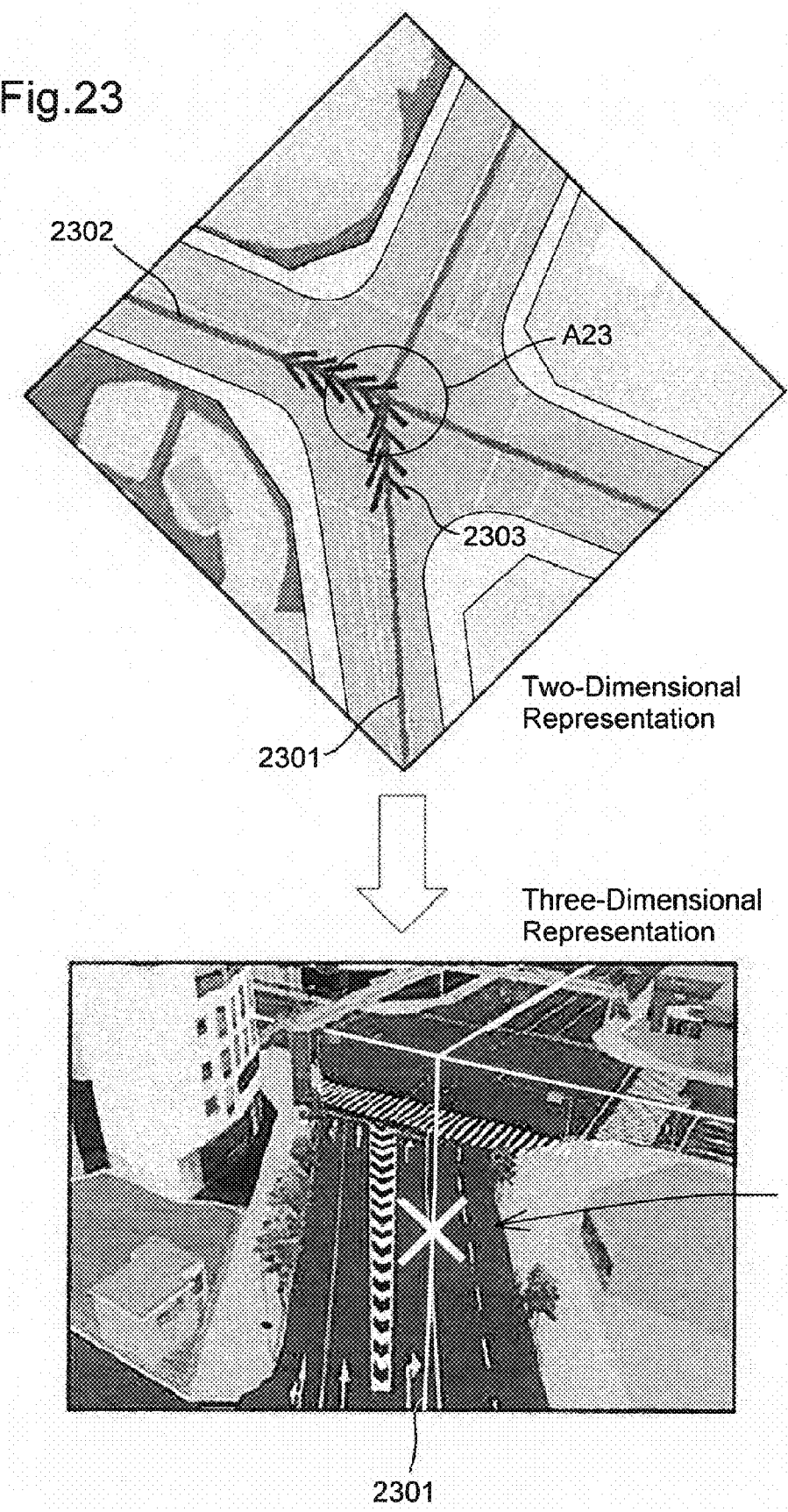

DATA STRUCTURE OF ROUTE GUIDANCE DATABASE

BACKGROUND OF THE INVENTION

1. Field of the Invention

The present invention relates to a data structure of a route guidance database utilized by a route guidance device to display guiding lines for guiding a moving body as an object of route guidance on a route.

2. Description of the Related Art

A route guidance device, such as a car navigation system, utilizes two-dimensional road network data, which specifies roads by nodes and links, to search a route from a starting point to a destination specified by the user. The route guidance device displays a current location detected by, for example, GPS (global positioning system) and the searched route on a map and performs a route guidance.

Diverse techniques, for example, a computer graphics-based technique of utilizing a three-dimensional model of buildings and other features to display a map in three-dimensional representation, have recently been proposed, with a view to facilitating the user's understanding of the route guidance.

One proposed structure of the route guidance device gives a preview guidance display of a three-dimensional moving image prior, to approach to a specific traffic intersection with a higher difficulty level than a preset reference value on a route to be guided (Japanese Patent Publication No. 3,745,235). The view approach of the three-dimensional moving image is changed according to the distance from a current location to the traffic intersection.

A road network is generally constructed in the form of a two-dimensional database. When a route and a current location obtained by referring to this two-dimensional database are shown on a three-dimensionally displayed map, the route or the current location may be displayed in the air above the ground or may be displayed in the ground according to the height of the road surface. In order to solve such problems, one proposed technique utilizes a road network including height information and displays the route and the current location by taking into account the height of each point (Japanese Patent Laid-Open No. 2005-321370).

For the easy understanding of the passage behavior through a traffic intersection, one proposed technique expresses each road having an up lane and a down lane by two-dimensional links with opposite directions and provides links corresponding to a right turn and a left turn in the traffic intersection (FIG. 12, Japanese Patent Publication No. 2,866,358).

Another proposed technique using such links with directions makes the shape of a traffic intersection in a guidance display close to the actual shape (Japanese Patent Laid-Open No. 1999-108679). The technique of this cited reference provides links corresponding to a right turn and a left turn in the traffic intersection as inner-intersection links, separately from ordinary links representing ordinary road sections and recognizes multiple nodes interconnected by the inner-intersection links as one traffic intersection. The resulting display of the traffic intersection has a relatively similar shape to the actual shape of the traffic intersection.

BRIEF DESCRIPTION OF THE INVENTION

The guidance display according to the actual passage behavior is easiest-to-understand for the user. The display of route guidance in a three-dimensional image seen from the user's view (hereafter referred to as 'driver's view) is also easiest-to-understand for the user.

For example, at a traffic intersection, the guidance display along a curved line according to an actual right turn or left turn is preferable to the guidance display along straight lines at a right angle expressed by two perpendicular links. Especially at a major intersection of roads having multiple lanes, a right-turn route bending substantially at a right angle causes the user's feeling of strangeness.

FIG. 23 is an explanatory view showing one example of guidance display with nodes and links for a route search. An upper drawing shows the display in two-dimensional representation, and a lower drawing shows the display in three-dimensional representation. The guidance display of this illustrated example guides a route along links 2301 and 2302 shown by line segments. The links 2301 and 2302 are set on the centers of respective roads and are interconnected by a node set at a traffic intersection A23. A wedge-shaped mark 2303 representing the own vehicle is displayed to have its vertex on the respective links to indicate the moving direction of the own vehicle. In this guidance display of the illustrated example, as the route to be guided shifts from the link 2301 to the link 2302 at the traffic intersection A23, the direction of the mark 2303 abruptly changes.

Such display in the driver's view may mislead the user about a wrong route of going straight at the traffic intersection. In order to assure the user's intuitive and accurate understanding of the guidance display, it is desired to display a curved route corresponding to the right turn.

Another important factor of the guidance display is the positional relation to an actual lane where the user currently runs. The nodes and the links for the route search may be set on the centers of the respective roads and may thus be deviated from the use's actually running lanes. The guidance display with the nodes and the links set in this manner may cause a route to be displayed on a center divider or in an opposite lane and lead to the user's feeling of strangeness. In the guidance display of the lower drawing of FIG. 23, a guiding line 2301 indicating a route enters an opposite lane after an area A24 shown by a cross 'x'. Such display especially in three-dimensional representation may significantly confuse the user. In the illustrated example of FIG. 23, the user running up along the guiding line 2301 may be intuitively misled into a right turn based on the right shift of the guiding line 2301 and may enter a right lane in preparation for a subsequent right turn. The guidance display in the driver's view increases the potential for the user's such misunderstanding.

On the occasion of approaching from a road with multiple lanes to a traffic intersection, a previous lane change is desirable in preparation for a subsequent right turn or left turn. Especially at a major traffic intersection, a lane change to a right lane or to a left lane prior to the traffic intersection may be essential for a subsequent right turn or left turn. The guidance display in the lower drawing of FIG. 23 may guide the user to a right lane, irrespective of a left turn expected at a next traffic intersection. The guidance display of this illustrated example is thus inadequate for the lane change.

The route guidance should accordingly give a guidance display according to the actual passage behavior, with avoiding any display that causes the user's feeling of strangeness or the user's misunderstanding. The guidance display according to the actual passage behavior is especially effective in the route guidance in the driver's view but is also useful in a three-dimensional map display in the bird's eye view as well as in a two-dimensional map display.

The prior art techniques can not, however, give such a guidance display according to the actual passage behavior. The technique of providing links corresponding to a right turn and a left turn at a traffic intersection as disclosed in Japanese Patent Publication No. 2,866,358 can give a guidance display of a curved route. This prior art technique, however, undesirably increases the number of links for the route search and causes another significant problem of the enormous time required for the route search. For guiding a lane change prior to a traffic intersection, the number of links representing roads should be increased with an increase in number of lanes. This further extends the time required for the route search.

In order to solve the problems of the prior art techniques discussed above, there would be a requirement for a guidance display according to the actual passage behavior without adversely affecting a route search.

BRIEF DESCRIPTION OF THE DRAWINGS

FIG. 23 is an explanatory view showing one example of guidance display with node and links for a route search.

DETAILED DESCRIPTION OF EMBODIMENTS OF THE INVENTION

Figure 1:
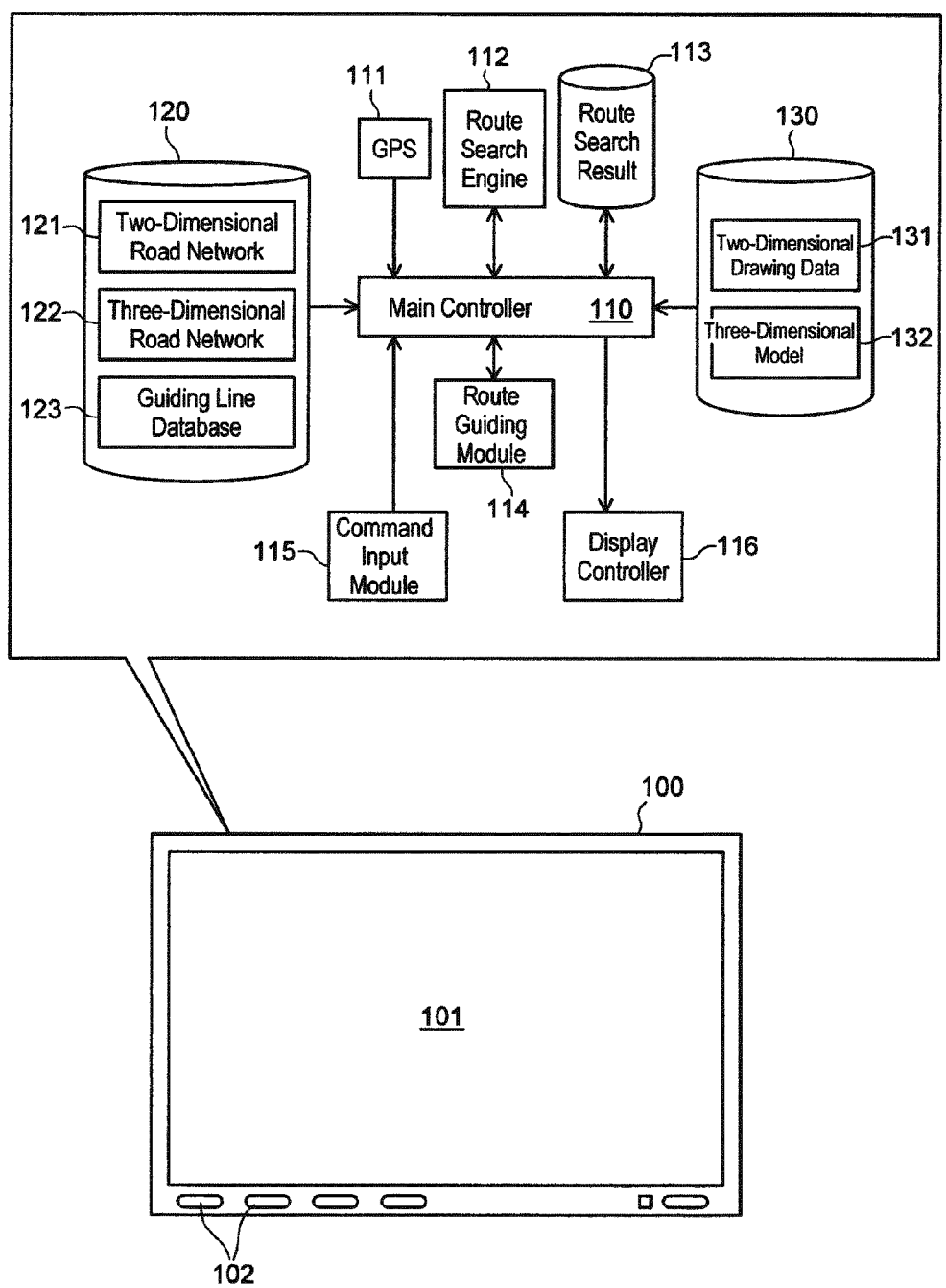
FIG. 1 is an explanatory view showing the system configuration of a route guidance device 100 in accordance with one embodiment of the invention.

One aspect of the invention is directed to a data structure of a route guidance database used to display a guiding line for guiding a moving body as an object of route guidance on a route. Typical examples of the moving body include vehicles, bicycles, and pedestrians.

The route guidance database is utilized by a route guidance device, which includes a computer and performs a sequence of processing to give a route guidance.

The route guidance device first reads a route search result, which specifies a route to be guided by a combination of nodes and links. The nodes and the links are components representing roads in the route search database. Each link represents a line segment or a polygonal line in the form of a sequence of points defined by position coordinates corresponding to an actual road. Each node represents a point defined by position coordinates corresponding to either an intersection point of multiple links or an end point of a link.

The route guidance device detects position coordinates of a current location of the moving body and displays a route to be taken by the moving body by referring to the route search result according to the detected position coordinates of the current location of the moving body. The route may be displayed, based on the combination of nodes and links specified as the route search result to inform the user of roads to be passed. The route may be displayed on a two-dimensional map or in three-dimensional representation.

The route guidance device refers to the route guidance database and gives a guidance display for guiding passage of the moving body on the route. The guidance display should be structured to facilitate the user's intuitive understanding of an expected passage direction. The guidance display may be given in two-dimensional representation or in three-dimensional representation. For the user's intuitive understanding, the display is preferably given in three-dimensional representation including the respective features expressed on the basis of a three-dimensional model. Especially preferable is the display in a view of the moving body, for example, in the driver's view.

The route guidance database used for route guidance according to one aspect of the invention includes guiding line shape data and relevant information. The route guidance database may be provided to include the route search database discussed above or may be provided separately from the route search database. In one application of the invention, the route search database may be provided in a server. The server may perform a route search and send the result of the route search to the route guidance device.

The guiding line shape data is used to specify a sequence of points as guiding line to be passed by the moving body on the route. With regard to a traffic intersection, for example, a straight guiding line for going straight and curved guiding lines for turning right and turning left may be set based on the guiding line shape data. With regard to an approach road to a traffic intersection, guiding lines for lane changes may be set based on the guiding line shape data. Providing diversity of guiding lines assures the user's intuitively understandable guidance display. Each of the guiding lines may be specified as a polygonal line or a curved line of connecting a sequence of points defined by position coordinates or may be defined by a function.

The guiding line shape data is provided in the form of the different database separately from the route search database. The increasing number of guiding lines accordingly has no substantial effect on the processing load of the route search.

The relevant information is provided in relation to each piece of the guiding line shape data and is structured to correlate the guiding line shape data to each route expressed by a combination of nodes and links. The route guidance device refers to the relevant information, specifies each relevant piece of the guiding line shape data based on the combination of the nodes and the links specified as the route search result, and displays a guiding line.

The data structure of the route guidance database according to one aspect of the invention provides the guiding line shape data used for route guidance in the form of the different database separately from the route search database. This arrangement enables the guidance display to be given according to the actual passage behavior without increasing the processing load of the route search. The route guidance database of the invention assures the route guidance in the user's intuitively understandable manner.

In the route guidance database according to one aspect of the invention, the relevant information may be provided in any of diverse data forms of correlating the nodes and the links in the route search database to the guiding line shape data.

In one available application of the data structure, the relevant information may be provided as a combination of nodes and links to be correlated to each piece of the guiding line shape data.

In another available application of the data structure, intermediate nodes and intermediate links structured as simplified representation of the guiding line shape data may be provided as part of the relevant information. The guiding line shape data may be correlated to the nodes and the links in the route search database via the intermediate nodes and the intermediate links. The intermediate nodes and the intermediate links may be correlated to the nodes and the links in the route search database in an 'n'-to-'m' relation (where 'n' and 'm' denote natural numbers).

In this application using the intermediate nodes and the intermediate links, the relevant information may be structured to additionally include first relevant data structured to show a relation of the nodes and the links in the route search database to the intermediate nodes and the intermediate links and second relevant data structured to show a relation of the guiding line shape data to the intermediate nodes and the intermediate links. The guiding line shape data can thus be correlated to the nodes and the links. Each actual road consists of a large number of nodes and links. Multiple pieces of the guiding line shape data are generally provided corresponding to each of the nodes and the links. Namely immense amount of time and labor is required for setting the correlation. This application of the data structure using the intermediate nodes and the intermediate links, however, enables the correlation of the guiding line shape data to the intermediate nodes and the intermediate links to be set separately from the correlation of the intermediate nodes and the intermediate links to the nodes and the links. This arrangement accordingly has the advantage of the relatively easy and flexible correlation of the guiding line shape data to the nodes and the links in the route search database. The guiding line shape data may be readily correlated to multiple different types of route search databases by simply changing the first relevant data of correlating the nodes and the links to the intermediate nodes and the intermediate links according to the type of the route search database, without changing the contents of the guiding line shape data and the relevant information.

In the data structure of the above application, the relevant information is structured to include the intermediate nodes and the intermediate links, the first relevant data, and the second relevant data. In the data structure of the route guidance database according to one aspect of the invention, the relevant information may be structured to have only one single type of data or to have a combination of multiple different types of data. In the description hereafter, a database including the intermediate nodes and the intermediate links and the first relevant data of correlating the intermediate nodes and the intermediate links to the nodes and the links in the route search database may be referred to as an 'intermediate database'.

The above application of the data structure may be generalized to correlate the guiding line shape data to the nodes and the links in the route search database in a hierarchical structure including the intermediate nodes and the intermediate links. The hierarchical structure of the above application has only one intermediate layer including the intermediate nodes and the intermediate links. The hierarchical structure may, however, have multiple different intermediate layers. One embodiment of the multi-layered structure has a first layer including first intermediate nodes and first intermediate links and a second layer including second intermediate nodes and second intermediate links. In this embodiment, the relevant information may be structured to include data representing the intermediate nodes and the intermediate links on both the first layer and the second layer, first relevant data of correlating the nodes and the links in the route search database to the first layer, second relevant data of correlating the first layer to the second layer, and third relevant data of correlating the second layer to the guiding line shape data. The relevant information with regard to a multi-layered structure having a greater number of intermediate layers may be constructed in a similar manner.

The intermediate database may be generated in any of various forms. For example, each of the intermediate nodes may be correlated to multiple nodes in the route search database. Multiple nodes located in a certain neighborhood in the route search database may thus be processed as one intermediate data. This arrangement advantageously simplifies the correlation to the guiding line shape data. For example, a traffic intersection defined by multiple nodes in the route search database may be expressed by one intermediate node.

Each of the intermediate links may be provided to include a specific piece of information indicating an available moving direction of the moving body. Namely each of the intermediate links may be structured to have a direction. Even when the links in the route search database are not structured to have directions, the actual road passage behavior can be reflected on the intermediate links with directions. This arrangement advantageously facilitates the correlation to the guiding line shape data. Multiple intermediate links may be provided for one road according to the number of lanes on the road.

The route guidance database may be structured to include combination data. The combination data is used to specify a guiding line going through multiple traffic intersections by a combination of multiple pieces of the guiding line shape data. The guiding line starts from an approach link specified in the route search result for approaching to one traffic intersection and ends at an exit link specified in the route search result for exiting from the traffic intersection.

While the route search result indicates passage through a certain traffic intersection, the presence of a center divider or some traffic regulation may not allow the moving body to pass through the certain traffic intersection in conformity with the route search result in the actual situation. Even in the case of the available passage of the moving body in conformity with the route search result, a route of going around another traffic intersection may be preferable in the actual situation.

The data structure of the route guidance database according to the above aspect of the invention includes the guiding line shape data provided separately from the route search database. The guiding line may thus be set independently of the passage behavior determined by the route search result. In the above case, a combination of multiple guiding lines may be specified to go around a neighbor traffic intersection, regardless of the route specified by the route guidance database. The combination data may be used to correlate the combination of multiple guiding lines thus specified to one traffic intersection. This arrangement enables guiding lines to be set in various combinations with avoiding the excessive complexity of the correlation of the guiding lines to the node.

The combination data may be included in either the intermediate database or the guiding line shape data. The combination data is thus usable even in the data structure without the intermediate database.

In accordance with one preferable embodiment of the data structure of the route guidance database according to the above aspect of the invention, the guiding line shape data has region information assigned to specify one of multiple region types corresponding to a positional relation to a traffic intersection.

The multiple region types include, for example, an intersection region representing an inner area of a traffic intersection, a connection region representing a specific area approaching to the traffic intersection, and a route region representing another area. Any other suitable regions may be defined according to the requirements.

The connection region is used as an area for specifying the guiding line shape data for a lane change before entering a traffic intersection. The connection region may be set as an adequate range for a lane change with regard to each traffic intersection, based on the attributes of an approach road to the traffic intersection, for example, the number of lanes, the speed limit, and the presence of an exclusive lane for a right turn or an exclusive lane for a left turn. Some traffic intersections may have no connection regions, while the other traffic intersections may have connection regions.

Using the region information desirably gives the easer-to-understand guidance display. The view approach of the three-dimensional representation may be changed over according to the region information. In one embodiment, the bird's eye view may be selected when the current location of the moving body is within a route region, and the driver's view may be selected when the current location of the moving body is within a connection region or an intersection region. In another embodiment, the display size of a map may be changed over according to the region information or the display mode of a map may be changed over between a north up representation (the top of the map corresponding to the north) and a heading up representation (the top of the map corresponding to the moving direction of the moving body).

In the data structure of the route guidance database according to the above aspect of the invention, the guiding line shape data may be provided in any of various applications.

In a first application, the guiding line shape data is provided for each of multiple available guiding lines starting from an approach link specified in the route search result for approaching to one traffic intersection and ending at an exit link specified in the route search result for exiting from the traffic intersection. For example, with regard to a traffic intersection with three available passage behaviors, going straight, turning right, and turning left, three guiding lines are set for approach links corresponding to the three passage behaviors, going straight, turning right, and turning left. This arrangement assures a reasonable route guidance using the guiding lines set for all the available passage behaviors through the traffic intersection.

In a second application, the guiding line shape data is provided to allow for an approach from one of multiple different approach points to the traffic intersection specified according to an angle between the approach link to the traffic intersection and the exit link from the traffic intersection. When the angle between the approach link and the exit link suggests a right turn at a traffic intersection, the guiding line shape data may be set to approach from the location on a right lane to the traffic intersection. When the angle between the approach link and the exit link suggests a left turn at a traffic intersection, on the other hand, the guiding line shape data may be set to approach from the location on a left lane to the traffic intersection. Setting the guiding line shape data to allow for the approach from the multiple different approach points enables a suitable guiding line to be displayed corresponding to the actual passage behavior.

With regard to a junction of five roads or a greater number of roads, changing the approach point for each exit link may undesirably complicate the shape of the guiding line. In order to avoid such complexity of the guiding line shape, the guiding line shape data may be provided to specify an approach point for each of three available passage behaviors through the traffic intersection, going straight, turning right, and turning left, that are defined according to the angle between the approach link and the exit link. This arrangement limits the number of approach points to three at the maximum and thus desirably prevents the excessive complexity of the guiding line shape.

In the above application, it is not required to set different approach points corresponding to different guiding lines. Multiple guiding lines may start from one identical approach point. For example, a guiding line for going straight and a guiding line for turning right may start from one identical approach point, while a guiding line for turning left may start from another approach point.

In the application using different approach points to start the guiding line, the guiding line shape data may be structured to include a specific piece of data representing a connection trajectory of connecting a moving trajectory of the moving body to an approach point in an area of each approach road to the traffic intersection. A guiding line set for a lane change corresponding to the approach point can thus be displayed as the connection trajectory in the area on the approach road to the traffic intersection.

The relevant information provided in relation to the specific piece of the guiding line shape data representing the connection trajectory may be structured preferably to include a piece of data used to specify the approach point. Different connection trajectories may thus be used according to the approach points. In the application of classifying the guiding line shape data by the region type, it is preferable to set the connection trajectory in the connection region.

In a third application, the guiding line shape data with regard to at least one traffic intersection is provided for each of multiple guiding lines running from an approach link via the traffic intersection to an exit link specified in the route search result to be directed to multiple different exit points corresponding to multiple available passage routes after the traffic intersection. For example, when the exit link has multiple lanes, a guiding line for entering a left lane and a guiding line for entering a right lane may be set as the guiding line after a right turn at a traffic intersection. The guiding line for entering the left lane is effectively used for a route of turning left immediately after the right turn at the traffic intersection. The guiding line for entering the right lane is effectively used for a route of going straight after the right turn at the traffic intersection.

In the application of setting multiple guiding lines for multiple different exit points, the relevant information with regard to the at least one traffic intersection may be preferably structured to correlate the guiding line shape data including data specifying the multiple available passage routes after the traffic intersection to the nodes and the links in the route search database. Multiple different guiding lines set for multiple different exit points may thus be used according to the passage route after the traffic intersection. This arrangement assures the route guidance with an adequate guiding line to be readily taken.

In the data structure of the route guidance database according to the above aspect of the invention, the guiding line shape data may be preferably provided as a three-dimensional sequence of points including position information and height information. The guidance display may be provided to show an adequate guiding line and the current location according to the height of the road in the driver's view or in another view approach of the three-dimensional representation. Such three-dimensional representation assures easy guidance to, for example, an elevated road.

The guiding line shape data may be provided as a two-dimensional sequence of points with only the position information, instead of the three-dimensional sequence of points.

In the data structure of the route guidance database according to the above aspect of the invention, the shape of the guiding line may be set arbitrarily. In order to attain the reasonable route guidance, it is preferable that a yaw angle calculated from the guiding line shape data as a change in moving direction at each point along the guiding line is not greater than an upper limit value. The upper limit value may be determined, for example, according to a deflection performance of the moving body at an expected speed on the route to be guided. A vehicle is a typical example of the moving body as the object of route guidance. The vehicle is not capable of abruptly changing the moving direction. The upper limit value of the yaw angle with regard to the vehicle is thus preferably set to a relatively small value, for example, 15 degrees.

Another aspect of the invention is a generation support system configured to support generation of the route guidance database discussed above.

The generation support system according to this aspect of the invention includes a map data reference module, a route guidance data reference module, a display controller, a command input module, and a correction controller.

The map data reference module refers to three-dimensional map data used for displaying a three-dimensional map including features expressed in three-dimensional representation. The route guidance data reference module refers to the route guidance database in a course of generation. The display controller displays the three-dimensional map in a view of the moving body as the object of route guidance based on the three-dimensional map data, while displaying the guiding line based on the route guidance database.

The generation support system allows for a simulation display of a guiding line based on the current settings of the route guidance database. The operator checks the simulation display and determines whether the currently set guiding line is suitable for route guidance.

In the generation support system, the command input module receives an operator's instruction on requirement or non-requirement for correction of the route guidance database as a checking result of the display. In response to the operator's correction instruction, the correction controller shifts the display to a correction window for correcting the route guidance database. In place of or in addition to the shift of the display to the correction window, the correction controller may output correction-relating information usable to specify a position as a target of the correction instruction in the route guidance database. The correction-relating information may be, for example, position coordinates at a displayed point or an ID assigned to a displayed guiding line, node, or link when the operator's correction instruction is given.

The generation support system according to one aspect of the invention enables the operator to efficiently correct inadequacy of the data with referring to the guidance display based on the settings of the route guidance database. The guiding line of even a smooth curve may be seen as an unnatural line with an abrupt change in direction or an unnatural line excessively close to a road sign on the guidance display. The operator can adequately check the naturalness or the unnaturalness of the guiding line on the guidance display. The generation support system of the invention gives the simulation display that enables the operator to check the naturalness or the unnaturalness of the guiding line and readily specify any unnatural position of the guiding line that requires correction. This arrangement assures the efficient correction of the route guidance database.

In one preferable embodiment of the invention, the generation support system further includes a yaw angle detection module. The yaw angle detection module determines whether the yaw angle calculated from the guiding line shape data is not greater than the upper limit value. Any unnatural guiding line, for example, a guiding line with an abrupt change in direction, can thus be automatically detected. In response detection of the guiding line shape data having the yaw angle exceeding the upper limit value, the function of the correction controller may shift the display to the correction window or may output the correction-relating information usable to specify the position to be corrected. This arrangement assures the efficient correction of the guiding line shape data.

The detection of the yaw angle may be performed with regard to only part of the guiding line shape data. The target positions of the yaw angle detection may be, for example, an approach point for approaching to a traffic intersection, an exit point for exiting from the traffic intersection, a point close to the center of the traffic intersection, a starting point of a lane change, and a terminal point of the lane change.

Still another aspect of the invention is a route guidance device configured to display a guiding line for guiding a moving body as an object of route guidance on a route.

The route guidance device includes a map data reference module, a route search result storage module, a route guidance database storage module, a current location detection module, and a display controller.

The map data reference module refers to three-dimensional map data used for displaying a three-dimensional map including features expressed in three-dimensional representation. The route search result storage module stores a route search result, which specifies a route to be guided by a combination of nodes and links. The route guidance database storage module stores a route guidance database including guiding line shape data and relevant information. The current location detection module detects position coordinates of a current location of the moving body.

The display controller specifies a route to be taken by the moving body by referring to the route search result according to the detected position coordinates of the current location of the moving body. The display controller also specifies the guiding line shape data corresponding to the route by referring to the relevant information, and gives a guidance display in three-dimensional representation for guiding passage of the moving body on the route, based on the three-dimensional map data and the specified guiding line shape data.

The route guidance device according to this aspect of the invention gives the user a readily recognizable guidance display. The guidance display is preferably given in a view of the moving body, for example, in the driver's view. The guidance display may otherwise be given in any of various view approaches, for example, in the bird's eye view. A guidance display in two-dimensional representation may additionally be given according to the requirements.

In one preferable application of the route guidance device according to the above aspect of the invention, the guiding line shape data has region information assigned to specify one of multiple region types corresponding to a positional relation to a traffic intersection. Here the multiple region types include an intersection region representing an inner area of a traffic intersection, a connection region representing a specific area approaching to the traffic intersection, and a route region representing another area. In this application, the route guidance device may be constructed to change over a view approach of the guidance display in three-dimensional representation according to the region type.

Using the region information advantageously enables the view approach of the guidance display in three-dimensional representation to be readily changed over without any complicated arithmetic operation, such as calculation of the distance from the current location to a traffic intersection. Instead of the changeover of the view approach, the size of the guidance display between expansion and contraction or the display mode of the guidance display between the north up representation and the heading up representation may be changed over according to the region type.

The relevant information may have any data structure that allows the guiding line shape data to be correlated to the nodes and the links in the route search database. Namely any data structure may be adopted as long as the nodes and the links in the route search database are eventually specifiable. It is not necessary that the relevant information alone is used to directly specify the nodes and the links in the route search database. For example, the relevant information may be structured to correlate the guiding line shape data to an external database, which is provided in some relation to the route search database. As long as the relevant information is correlated to the external database having some relation to the route search database, the guiding line shape data can be indirectly correlated to the route search database.

One embodiment of such indirect correlation may provide the intermediate database discussed above as the external database, separately from the components of the route guidance database according to the above aspect of the invention. In this embodiment, the intermediate database provided as the external database includes intermediate nodes, intermediate links, and first relevant data of correlating the intermediate nodes and the intermediate links to the nodes and the links in the route search database. The route guidance database includes guiding line shape data and relevant information or more specifically second relevant information of correlating the guiding line shape data to the intermediate nodes and the intermediate links.

The guiding line shape data can thus be correlated to the intermediate nodes and the intermediate links in the external database by referring to the second relevant data. The intermediate nodes and the intermediate links in the external database are correlated to the route search database by means of the first relevant data. Namely the guiding line shape data is indirectly correlated to the route search database.

One application based on such indirect correlation may perform a route guidance with an external server including the route search database and the intermediate database provided as the external database. In this application, the route guidance device has the guiding line shape data and the relevant information in the form of the route guidance database. The external server refers to the external database according to a route search result, specifies intermediate nodes and intermediate links to be displayed for the route guidance, and sends the specification result to the route guidance device. The route guidance device refers to the relevant information to specify the guiding line shape data corresponding to the specified intermediate nodes and intermediate links and gives a guidance display.

When the external server updates the contents of the route search database and the intermediate database, this arrangement advantageously enables the route guidance device to utilize the updated route search database without updating the contents of the route guidance database.

It is not essential that any of the applications of the invention has all the features discussed above. The applications of the invention may be actualized by omitting some of these features or by combining some of these features. The technique of the invention is not restricted to the data structure of the route guidance database, the generation support system for supporting generation of the route guidance database, or the route guidance device but may be actualized by diversity of other applications.

Other applications of the invention include a generation support method and a route guidance method performed by the computer to attain the functions of the generation support system and the functions of the route guidance device, as well as computer programs causing the computer to perform the generation support method and the route guidance method. Other applications also include computer readable recording media for recording such computer programs or the route guidance database therein. Typical examples of the recording media include flexible disks, CD-ROMs, magneto-optical disks, IC cards, ROM cartridges, punched cards, prints with barcodes or other codes printed thereon, internal storage devices (memories such as RAMs and ROMs) and external storage devices of the computer, and diversity of other computer readable media.

BEST MODES OF CARRYING OUT THE INVENTION

One mode of carrying out the invention is discussed below as a preferred embodiment in the following sequence with reference to the accompanied drawings:
   A. System Configuration of Route Guidance Device
   B. Structure of Route Guidance Database
   B1. General Structure
   B2. Structure of Three-Dimensional Road Network
   B3. Structure of Guiding Line Database
   B4. Exemplary Settings of Route Guidance Data
   C. Generation Support System for Route Guidance Database
   C1. System Configuration
   C2. Base Guiding Line Shape Generation Process C3. Yaw Angle Detection Process
C4. Simulation Process
D. Route Guidance Process
E. Effects A. System Configuration of Route Guidance Device FIG. 1 is an explanatory view showing the system configuration of a route guidance device 100 in accordance with one embodiment of the invention. The route guidance device is used to search for a route from a point of departure to a destination specified by each user and keep displaying the route to the destination according to the current location of the user. The system configuration of FIG. 1 shows one example constructed as an on-board car navigation device. The route guidance device may also be constructed as a pedestrian navigation device. The route guidance device 100 is not limited to the structure as the on-board device but may be incorporated in a mobile terminal, such as a cell phone or a PDA (personal digital assistant).

The route guidance device 100 has a main body including a display 101 and switches 102. The user operates the switches 102 with referring to menus sequentially opened on the display 101, so as to specify conditions for route search including a point of departure, a destination, and selection of either the time priority or the distance priority. On each occasion of route guidance, a map and a route are shown on the screen of the display 101. The user operates the switches 102 to change over the display mode between a north up representation (the top of the map corresponding to the north) and a heading up representation (the top of the map corresponding to the moving direction of the moving body) or to change over the display size of the map.

The upper half of FIG. 1 shows functional blocks implemented on the route guidance device 100. In this embodiment, the route guidance device 100 has a microcomputer including a CPU, a ROM, and a RAM. The respective functional blocks illustrated in FIG. 1 are provided mainly as the software configuration according to a control program stored in the ROM. Alternatively each of these functional blocks may be actualized by the hardware configuration.

In the configuration of this embodiment, the route guidance device 100 is designed as a stand-alone device having all the required functional blocks. In one modified configuration, at least part of the functions may be provided by a server connecting with the route guidance device 100 via a network or another communication line.

The route guidance device 100 has diversity of databases provided for route search and route guidance. These databases may be stored directly in the route guidance device 100, may be provided in the form of a suitable recording medium, such as a DVD, or may be supplied from the server via the network or the communication line.

A route search and guidance database 120 includes a two-dimensional road network 121, a three-dimensional road network 122, and a guiding line database 123. The combination of the three-dimensional road network 122 with the guiding line database 123 corresponds to the route guidance database in the claims of the invention. The three-dimensional road network 122 is equivalent to the intermediate database in the claims of the invention.

The two-dimensional road network 121 (hereafter may be referred to as 'PF network') is constructed as data for expressing roads by the combinations of nodes and links and is mainly used for route search and route guidance according to a two-dimensional map. Each link represents a line segment or a polygonal line in the form of a sequence of points defined by position coordinates corresponding to an actual road. Each node represents a point defined by position coordinates corresponding to either an intersection point of multiple links or an end point of a link. Only one link may be set for each interval between adjacent traffic intersections on each road (hereafter this may be referred to as 'one-line representation'). Alternatively two links may be set for an up lane and a down lane of the interval (hereafter this may be referred to as 'two-line representation').

Both the three-dimensional road network 122 (hereafter may be abbreviated to '3D network') and the guiding line database 123 are used for route guidance. The guiding line database 123 stores data used to display a guiding trajectory in conformity with the actual vehicle passage behavior, for example, guiding lines for a route guidance, mainly on a guidance display in the driver's view. The three-dimensional road network 122 is constructed as intermediate data functioning to correlate the guiding line database 123 to the two-dimensional road network 121. The data structures and the data contents of the three-dimensional road network 122 and the guiding line database 123 will be described later.

A display database 130 includes two-dimensional drawing data 131 and a three-dimensional model 132. The two-dimensional drawing data 131 represents map data used to display a two-dimensional map and includes polygon data for expressing roads and diversity of other features). The three-dimensional model 132 has data used to give a guidance display with various features in three-dimensional representation. The three-dimensional model 132 is constructed as data used to display guide boards, street signs, guardrails, and street plants located in a neighborhood of each road, as well as data used to display elevated roads, buildings, and diversity of other constructions. The guidance display generated based on the data of the three-dimensional model 132 substantially reproduces a sight that is actually visible to the user.

A main controller 110 integrates and controls the operations of the route guidance device 100 relating to the route search and the route guidance. A command input module 115 functions to input various commands, for example, a command for specifying the conditions of route search and a command for changing over the display of route guidance, in response to the user's operations of the switches 102. A display controller 116 controls the display operations of, for example, a menu window and a guidance display, on the display 101.

A route search engine 112 refers to the two-dimensional road network 121 and searches for a route that fulfill the user's specified conditions. The known Dijkstra's algorithm may be adopted for the method of route search. A route search result 113 represents a memory area for storing the result of a route search. The result of a route search may be stored in any suitable form. In this embodiment, the result of a route search is stored in the form of a link node sequence, which specifies a sequence of links and nodes to be passed through.

A GPS 111 adopts a global positioning system to detect a current location. The combination of the detection result of a gyroscope with the detection result of the GPS 111 enhances the accuracy of the location detection.

A route guiding module 114 functions to give a guidance display of a route stored in the route search result 113 according to the detected current location, on the display 101. The guidance display may be generated to show a searched route on a two-dimensional map (hereafter referred to as 'two-dimensional representation') or may be generated to show a searched route by utilizing the three-dimensional model (hereafter referred to as 'three-dimensional representation'). The two-dimensional representation is based on the two-dimensional drawing data 131 and the two-dimensional road network 121. The three-dimensional representation is based on the three-dimensional model 132 and the guiding line database 123. The three-dimensional representation may adopt any of various view approaches, such as a bird's eye view or a driver's view. The view approach of the three-dimensional representation may be changed over in response to the user's instruction or may be changed over automatically according to the positional relation to a traffic intersection. A control process for automatically changing over the view approach will be described later, together with a control process of route guidance.

Figure 2:
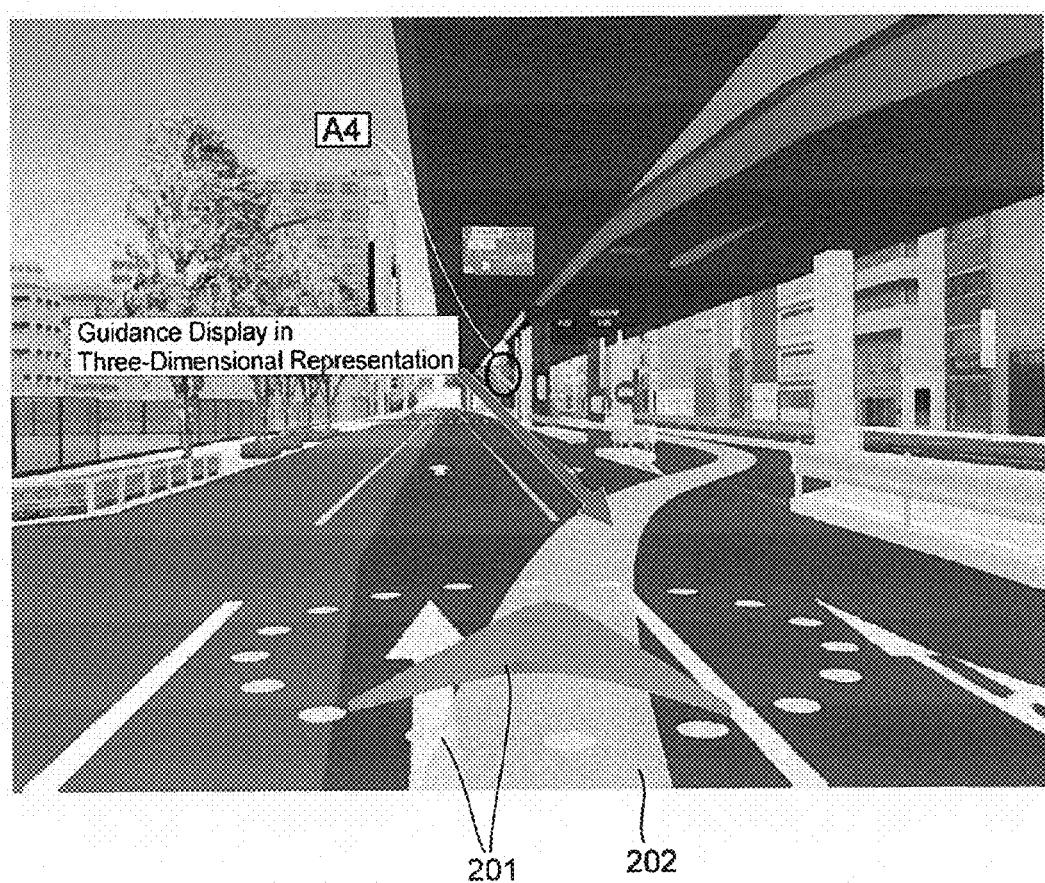
FIG. 2 is an explanatory view showing a display example of route guidance.

FIG. 2 is an explanatory view showing a display example of a route guidance. This is the display example in the driver's view. As illustrated, the driver's view gives three-dimensional representation of various features, for example, elevated roads, buildings, guardrails, and street plants. The sight from the user's view is shown on the display 101. A route to be followed is shown by a guiding line 202 in three-dimensional representation. In this display example, markers 201 are also shown to have a role of a leading vehicle guiding the own vehicle.

The guiding line 202 is generated based on three-dimensional data. The guiding line can thus be displayed along a ramp to an elevated road as shown in an area A2. Such display assures a route guidance that is intuitively understandable for the user and does not bring the user's feeling of strangeness.

The driver's view is not limited to the display example of FIG. 2 but may have any of various display modes. For example, only one of the guiding line 202 and the markers 201 may be shown on the display. The line type of the guiding line 202 and the shape of the markers 201 may be determined arbitrarily.

B. Structure of Route Guidance Database

B1. General Structure

Figure 3:
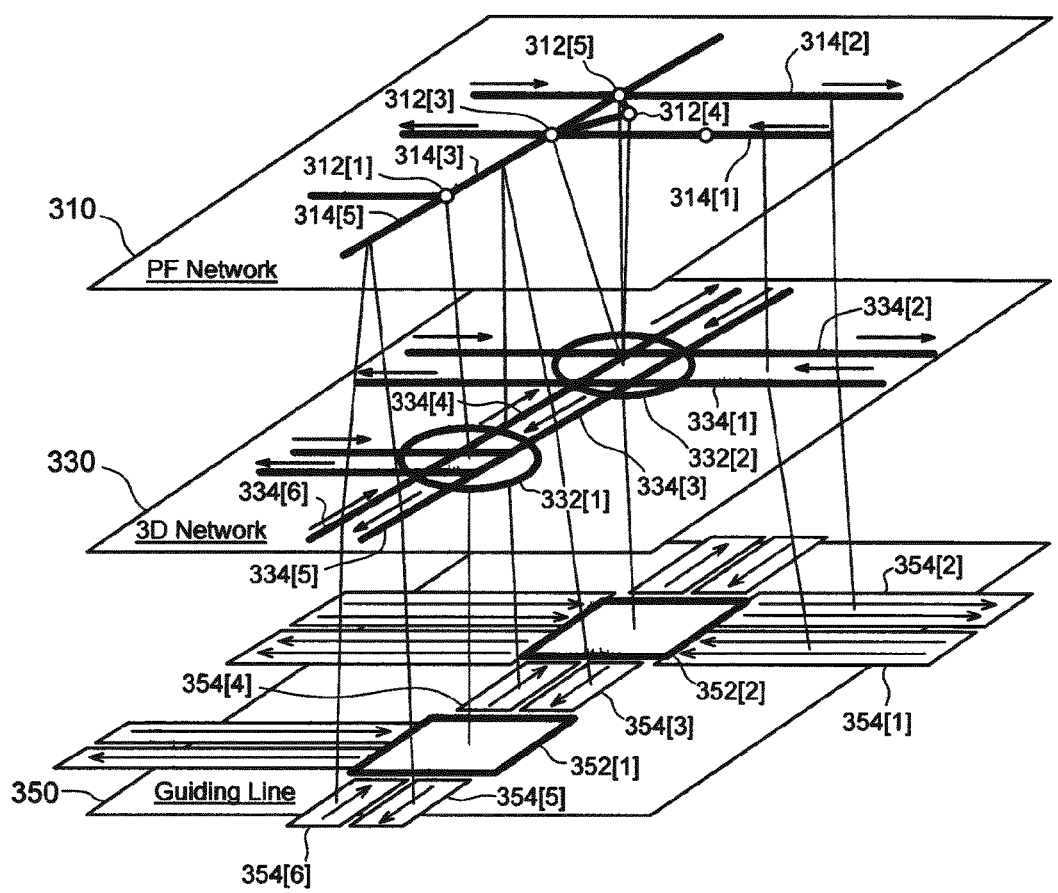
FIG. 3 is an explanatory view showing relations of a route guidance database.

FIG. 3 is an explanatory view showing the relations of the route guidance database. In this embodiment, the three-dimensional road network (3D network) and the guiding line database are provided as the databases used for the three-dimensional representation. FIG. 3 shows the relations between the two-dimensional road network (PF network) used for the route search and the 3D network and the guiding line database. An uppermost plane, a middle plane, and a lowermost plane respectively show the two-dimensional road network 310, the 3D network 330, and the guiding line database 350.

The PF network 310 shows roads by the combination of nodes 312 and links 314. The individual nodes and links are expressed in an identifiable manner by suffix numerals [1], [2], etc., like a node 312[1] and a link 314[1].

Each of links 314[1] and 314[2] is a one-way link that allows for passage of vehicles only in one direction defined by each corresponding arrow. This corresponds to the two-line representation showing an up lane and a down lane of each road. Each of links 314[3] and 314[5] is a two-way link that allows for passage of vehicles in opposing directions. This corresponds to the one-line representation. The links 314[3] and 314[5] may alternatively be expressed by the two-line representation. Nodes 312[3] through 312[5] are located at intersections between roads expressed with the links 314[1] and 314[2] by the two-line representation and a road expressed with the link 314[3] by the one-line representation. A node 312[4] is a dummy node set irrespective of the actual road contour, with a view to adequately searching for a U-turn route in a traffic intersection.

The PF network 310 is constructed as a database for route search, so that the nodes 312 and the links 314 are not required to reproduce a shape faithfully reflecting the actual road contour. As explained above, a road actually having both an up lane and a down lane may be expressed by the one-line representation, like the link 314[3]. The links 314[1] and 314[2] are shown apparently as different roads on the PF network 310 but actually represent an up lane and a down lane of one identical road. The PF network 310 also includes nodes set for only the convenience of route search, irrespective of the actual road contour, like the dummy node 312[4].

The guiding line database 350 stores data used to faithfully represent the actual passage behavior on each road. As illustrated, guiding lines 354[1] through 354[6] are set corresponding to up lanes and down lanes of respective roads. With regard to a road having multiple lanes each way, multiple guiding lines 354 may be set corresponding to the respective lanes. With regard to a road with no distinct division into lanes, since the vehicle generally runs close to one edge of the road corresponding to its running direction rather than the center of the road, a guiding line 354 corresponding to each traffic direction may be set at an adequate position according to the actual passage behavior. In the illustrated example, the guiding lines 354[1] and 354[2] are set for a four-lane road. The other guiding lines 354[3] through 354[6] are set for two-lane roads.

A road expressed by the one-line representation, for example, the link 314[5], on the PF network 310 may be expressed with the multiple guiding lines 354[5] and 354[6] on the guiding line database 350. Such expression assures the guidance display in conformity with the actual passage behavior. The guiding line 354 may not be necessarily set corresponding to each of the multiple lanes each way on the road but may be set corresponding to only a representative lane each way on the road. For example, a four-lane road expressed with the guiding lines 354[1] and 354[2] in the illustrated example may be expressed with guiding lines generally used for two-lane roads.

The intersections expressed with the nodes 312[3] through 312[5] on the PF network 310 are given as one single intersection 352[2] on the guiding line database 350. Such expression enables the guidance display to be changed according to the actual passage behavior, for example, by adopting different guidance modes at traffic intersections and at locations other than traffic intersections.

Guiding lines are set in each of the intersections 352[1] and 352[2] according to the actual passage behavior. For the clarity of illustration, however, these guiding lines are omitted from the illustrated example. The guiding lines in a traffic intersection will be discussed later in detail.

The 3D network 330 is constructed as intermediate data functioning to correlate the PF network 310 to the guiding line database 350. The 3D network 330 consists of 3D nodes 332 and 3D links 334, like the PF network 310.

The 3D links 334 are correlated to the links 314 on the PF network 310. By taking into account the actual passage behavior, however, the 3D links 334 are set according to available traffic directions on the respective roads. The links 314[3] and 314[5] expressed by the one-line representation on the PF network 310 are given as 3D links 334[3] through 334[6] according to the respective traffic directions on the 3D network 330. The links 314[1] and 314[2] expressed by the two-line representation on the PF network 310 are given as 3D links 334[1] and 334[2] similarly expressed by the two-line representation on the 3D network 330.

The 3D nodes 332 are correlated to the nodes 312 on the PF network 310. One 3D node 332 may, however, be correlated to multiple nodes 312 on the PF network 310 by taking into account the actual situation of each traffic intersection. In the illustrated example, the nodes 312[3] through 312[5] on the PF network 310 are correlated to one 3D node 332[2] on the 3D network 330.

Figure 4:
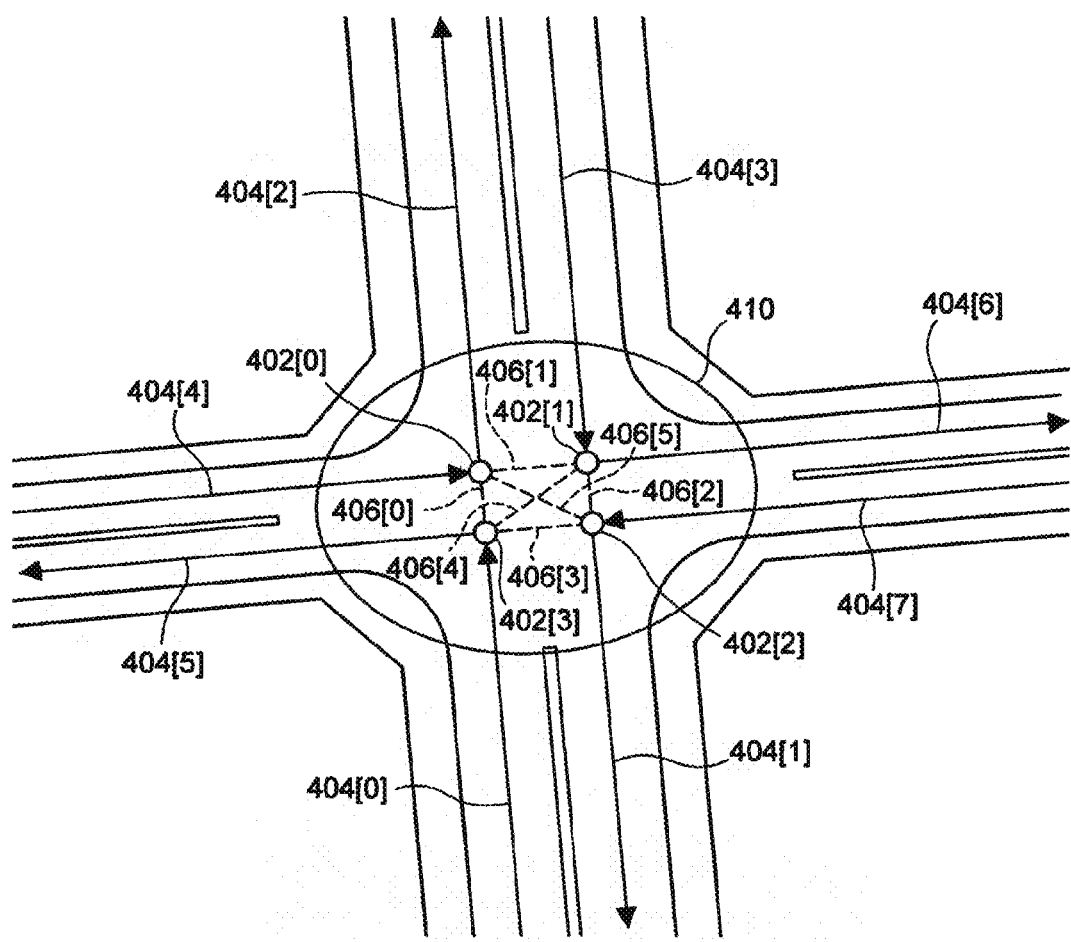
FIG. 4 is an explanatory view showing an exemplary setting of a 3D node.

FIG. 4 is an explanatory view showing an exemplary setting of a 3D node. This illustrated example shows an intersection expressed with links 404[0] through 404[7] by the two-line representation on a PF network. In the illustrated intersection, nodes 402[0] through 402[3] on the PF network are set at intersection points of the respective links 404. Links 406[0] through 406[5] may additionally be set in the intersection to interconnect the respective nodes 402[0] through 402[3].

In this illustrated example, eight 3D links are set on a 3D network to be correlated to the links 404[0] through 404[7] expressed by the two-line representation on the PF network. A 3D node 410 is set to express the intersection on the 3D network. Namely the four nodes 402[0] through 402[3] on the PF network are correlated to one 3D node 410.

One intersection is expressed with one 3D node 410 on the 3D network. The 3D network accordingly does not require 3D links corresponding to the links 406[0] through 406[5] set in the intersection on the PF network. The links 406[0] through 406[5] set in the intersection on the PF network are thus correlated to the 3D node 410 on the 3D network.

In this embodiment, the 3D network is constructed to have data for correlating 3D nodes and 3D links to nodes and links on the PF network (hereafter may respectively be referred to as 'PF nodes' and 'PF links'). Data for correlating the respective guiding lines 354 and the respective intersections 352 to 3D links and 3D nodes on the 3D network is attached to guiding line shape data provided in the form of the guiding line database.

In the data structure of this embodiment, the guiding line shape data is correlated to the PF network via the 3D network as explained above. The data structure may be modified to directly correlate the guiding line shape data to the PF network. Using the 3D network as the intermediate data, however, has the advantage of the relatively easy and flexible correlation.

Figure 5:
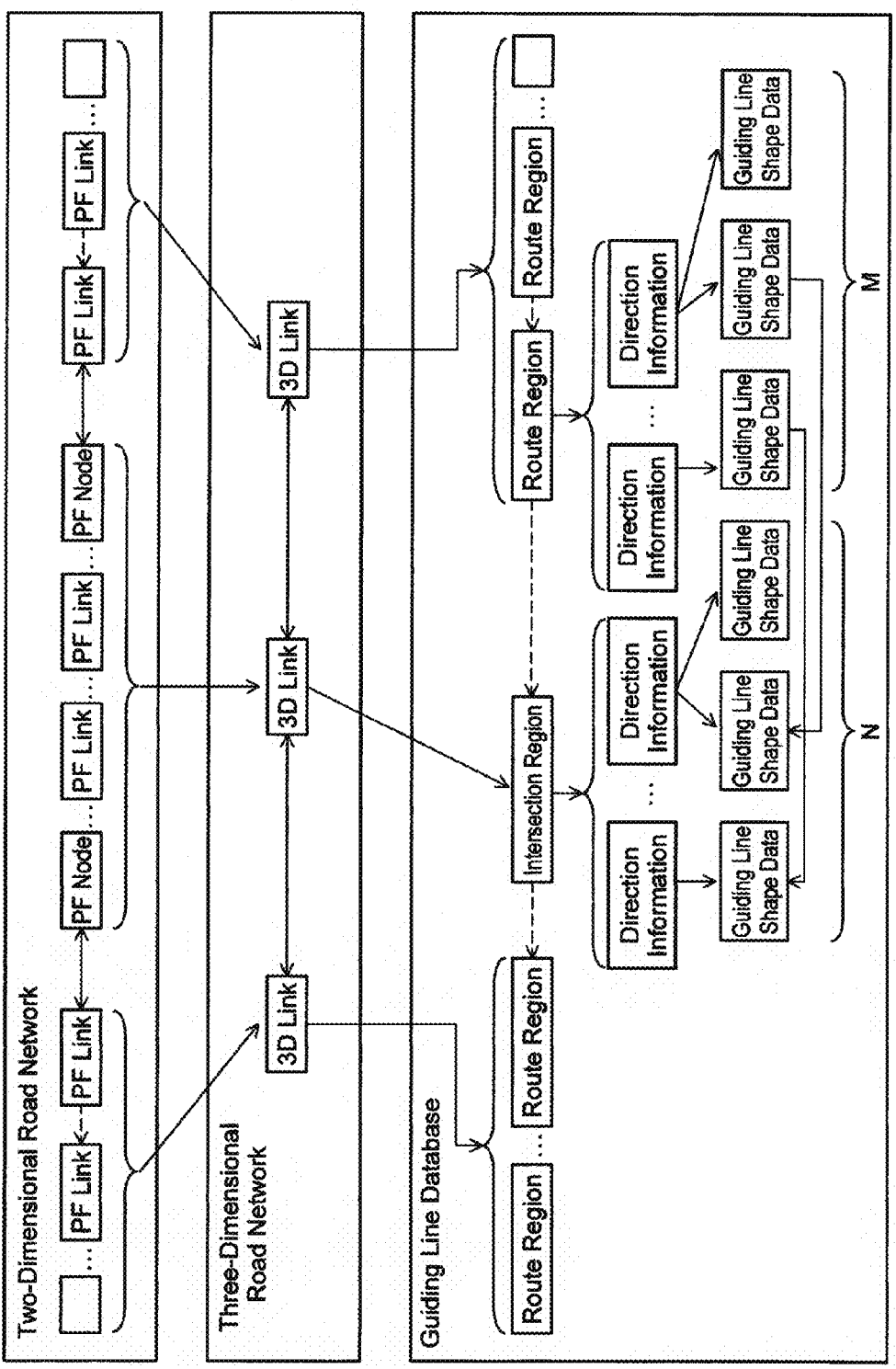
FIG. 5 is an explanatory view showing one example of relations among respective components in the database.

FIG. 5 is an explanatory view showing one example of relations among respective components in the database. An uppermost box shows components of a two-dimensional road network, a middle box shows components of a three-dimensional road network, and a lowermost box shows components of a guiding line database. There are certain relations established among these components.

The two-dimensional road network has PF links and PF nodes as shown in the uppermost box. The three-dimensional road network has 3D links and 3D nodes as shown in the middle box. The PF links and the PF nodes are correlated to the 3D links and the 3D nodes. There may be one-to-one relation of correlating one PF link or PF node to one 3D link or 3D node or alternatively many-to-one-relation of correlating multiple PF links and PF nodes to one 3D link or 3D node as shown in the illustrated example.

The guiding line shape data are generated with regard to respective types of regions, for example, a route region and an intersection region, as discussed later. The 3D links and the 3D nodes are correlated to the respective regions. There may be one-to-one relation of correlating one 3D link or 3D node to one region or alternatively one-to-many relation of correlating one 3D link or 3D node to multiple regions as shown in the illustrated example.

Each region includes direction information and guiding line shape data. Each of the guiding line shape data is given as a line segment or a polygonal line formed by a sequence of points for displaying a guiding line as shown in FIG. 2. The direction information is used to specify guiding line shape data to be used for the route guidance according to the passage behavior in each region. For example, multiple passage behaviors, such as going straight, turning right, and turning left, are generally expected for each intersection region. Multiple pieces of guiding line shape data are thus provided for this intersection region to make an adequate guidance display corresponding to an actual passage behavior. Multiple pieces of direction information are also provided corresponding to the multiple pieces of guiding line shape data. With regard to a certain intersection region, multiple pieces of guiding line shape data may be provided for one passage behavior, for example, turning right, to select a right lane or select a left lane after the right turn. As shown in the illustrated example, multiple pieces of direction information are generally correlated to each region, and one or multiple pieces of guiding line shape data are correlated to each piece of direction information.

The data structure explained above assures a route guidance display based on a route search result. The route guidance process of this embodiment refers to the three-dimensional road network to specify a combination of 3D links and 3D nodes correlated to a sequence of PF links and PF nodes indicated as the route search result. The route guidance process subsequently refers to the guiding line database to specify a region corresponding to the current location among regions correlated to the specified 3D links and 3D nodes either in the one-to-one relation or in the many-to-one relation. The route guidance process then specifies direction information included in each of the regions, based on the 3D links and the 3D nodes on the searched route and specifies guiding line shape data correlated to the specified direction information. The specified guiding line shape data is used to display guiding lines for guiding the vehicle along the searched route on the guidance display.

The data structures and the data contents of the three-dimensional road network and the guiding line database in the embodiment are described in detail below.

B2. Structure of Three-Dimensional Road Network

Figure 6:
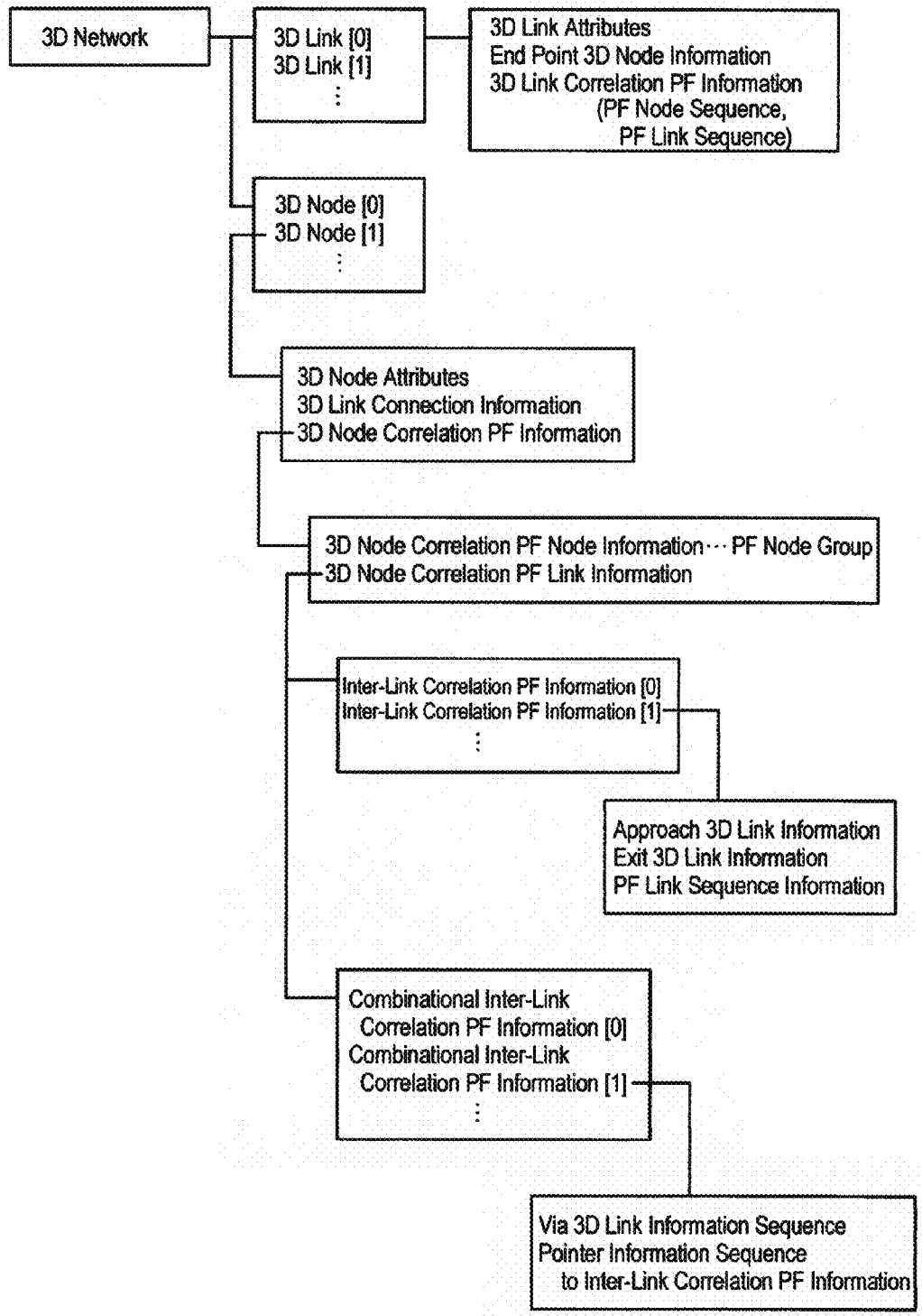
FIG. 6 is an explanatory view showing the data structure of a 3D network.

FIG. 6 is an explanatory view showing the data structure of the 3D network. The components included in the 3D network are shown in a hierarchical manner.

As illustrated, the 3D network includes data of multiple 3D links and multiple 3D nodes. Suffix numerals [1], [2], etc. attached to the 3D links or the 3D nodes indicate the presence of multiple data.

(1) 3D Links

Each 3D link has 3D link attributes, end point 3D node information, and 3D link-correlated PF information.

The 3D link attributes include an identifier '3D link ID' unequivocally assigned to the 3D link. The 3D link attributes may further include information regarding the type and the number of lanes of a road corresponding to the 3D link. The 3D link ID is used as a retrieval key in the 3D network and the guiding line database.

The end point 3D node information is constructed as data representing 3D nodes located at a starting point and at a terminal point of the 3D link. The end point 3D node information includes identifiers '3D node IDs' (discussed later) assigned to these 3D nodes.

The 3D link-correlated PF information represents a correlation of the 3D link to one or multiple PF links and PF nodes. The 3D link-correlated PF information includes identifiers 'PF link IDs' and 'PF node IDs' assigned to the PF links and the PF nodes correlated to the 3D link. Since multiple PF links and PF nodes may be correlated to one 3D link, the 3D link-correlated PF information has the capacity for storing multiple PF link IDs and PF node IDs.

(2) 3D Nodes

Each 3D node has 3D node attributes, 3D link connection information, and 3D node-correlated PF information.

The 3D node attributes include an identifier '3D node ID' unequivocally assigned to the 3D node and the type of the 3D node.

In this embodiment, 3D nodes are classified into four different node types, an ordinary 3 node type, a terminal 3D node type, a dummy 3D node type, and a boundary 3D node type. A 3D node may generally be set at an intersection point of multiple 3D links, that is, at a traffic intersection. The ordinary 3 node type includes such 3D nodes set at traffic intersections. A 3D node may also be set at a dead end of a 3D link. The terminal 3D node type includes such 3D nodes set at dead ends. A 3D node is correlated to one or multiple PF nodes on the PF network and may thus be set at a meaningless position unnecessary for the route guidance. The dummy 3D node type includes such 3D nodes that are set to only clarify the correlation to the PF nodes on the PF network and are unnecessary for the route guidance. Map data are generally provided in grids of a predetermined size. When a boundary of one grid interrupts a road, a virtual node may be set at the interrupting position on the boundary that is neither an intersection nor a dead end. The boundary 3D node type includes such 3D nodes set on the boundaries of the grids. Classifying the 3D nodes into the multiple different node types enables the display contents of the guidance display to be changed according to the node types.

The 3D link connection information includes 3D link IDs representing 3D links connected to the 3D node. As explained previously, each 3D link includes the end point 3D node information. The 3D link connection information is used in combination with the end point 3D node information. When a 3D link is specified, 3D nodes located at both ends of the specified 3D link are specifiable by referring to the end point 3D node information. When a 3D node is specified, on the other hand, 3D links connecting with the specified 3D node are specifiable by referring to the 3D link connection information. 3D nodes and 3D links connecting with a specified 3D link or 3D node can thus be specified sequentially by successively referring to the end point 3D node information and the 3D link connection information.

(3) 3D Node-Correlated PF Information

The 3D node-correlated PF information represents correlations of the 3D node to one or multiple PF nodes and PF links on the PF network. As illustrated, information representing a correlation of the 3D node to one or multiple PF nodes is referred to as '3D node-correlated PF node information'. Information representing a correlation of the 3D node to one or multiple PF links is referred to as '3D link-correlated PF link information'. The 3D node-correlated PF node information includes one or multiple PF node IDs representing one or multiple PF nodes correlated to the 3D node.

The 3D node-correlated PF link information includes 'inter-link correlation PF information' and 'combinational inter-link correlation PF information'.

The inter-link correlation PF information represents a sequence of PF links corresponding to a route approaching from one 3D link to a 3D node and exiting from the 3D node to another 3D link. The inter-link correlation PF information includes 'approach 3D link information' specifying an approach 3D link approaching to a 3D node, 'exit 3D link information' specifying an exit 3D link exiting from the 3D node, and 'PF link sequence information' regarding a sequence of PF links corresponding to a route between the approach 3D link and the exit 3D link. The approach 3D link information and the exit 3D link information respectively include identifiers 3D link IDs, and the PF link sequence information includes identifiers PF link IDs. There are multiple available routes approaching from one 3D link to a 3D node and exiting from the 3D node to another 3D link. Multiple pieces of the inter-link correlation PF information are thus generated corresponding to the multiple available routes.

(4) Inter-Link Correlation PF Information

The contents of the inter-link correlation PF information are explained with reference to the illustrated example of FIG. 4. In this illustrated example, there are two available routes approaching from the PF link 404[0] to the 3D node 410, turning right, and exiting from the 3D node 410 to the PF link 404[6]:

Route 1: PF link 404[0]→PF link 406[0]→PF link 406[1]→PF link 404[6]

Route 2: PF link 404[0]→PF link 406[4]→PF Link 404[6]

The PF link sequence information is generated separately for a sequence of PF links corresponding to the route 1 and for a sequence of PF links corresponding to the route 2. A 3D link ID assigned to a 3D link corresponding to the PF link 404[0] on the approach side and a 3D link ID assigned to a 3D link corresponding to the PF link 404[6] on the exit side are respectively correlated as the approach 3D link information and the exit 3D link information to the respective pieces of the PF link sequence information. The approach 3D link information, the exit 3D link information, and the PF link sequence information constitute the inter-link correlation PF information.

In the illustrated example of FIG. 4, there is only one available route approaching from the PF link 404[0] to the 3D node 410, going straight, and exiting from the 3D node 410 to the PF link 404[2]:

Route 3: PF link 404[0]→PF link 406[0]→PF link 404[2]

The PF link sequence information generated for a sequence of PF links corresponding to the route 3 forms part of the inter-link correlation PF information. In this case, 3D link IDs assigned to 3D links corresponding to the PF links 404[0] and 404[2] are also included as the approach 3D link information and the exit 3D link information in the inter-link correlation PF information.

Similarly there is only one available route approaching from the PF link 404[0] to the 3D node 410, turning left, and exiting from the 3D node 410 to the PF link 404[5]:

Route: PF link 404[0]→PF link 404[5]

The PF link sequence information generated for a sequence of PF links corresponding to this route forms part of the inter-link correlation PF information. In this case, 3D link IDs assigned to 3D links corresponding to the PF links 404[0] and 404[5] are also included as the approach 3D link information and the exit 3D link information in the inter-link correlation PF information.

The inter-link correlation PF information is similarly generated for each of available routes approaching from the other PF links 404[3], 404[4], 404[7] to the 3D node 410. All the multiple pieces of information generated as discussed above are stored as the inter-link correlation PF information with regard to the 3D node 410.

The inter-link correlation PF information of the above example is set for the case of the one-to-one relation of correlating one 3D node 410 to one traffic intersection. In this embodiment, one 3D node may be correlated to multiple PF links and PF nodes as mentioned previously. When multiple traffic intersections are located relatively close to each other, these traffic intersections may be collectively processed as one 3D node. Such correlation desirably simplifies the structure of the 3D network and enables a route adequate for the actual passage behavior to be specified by the inter-link correlation PF information as discussed below.

Figure 7:
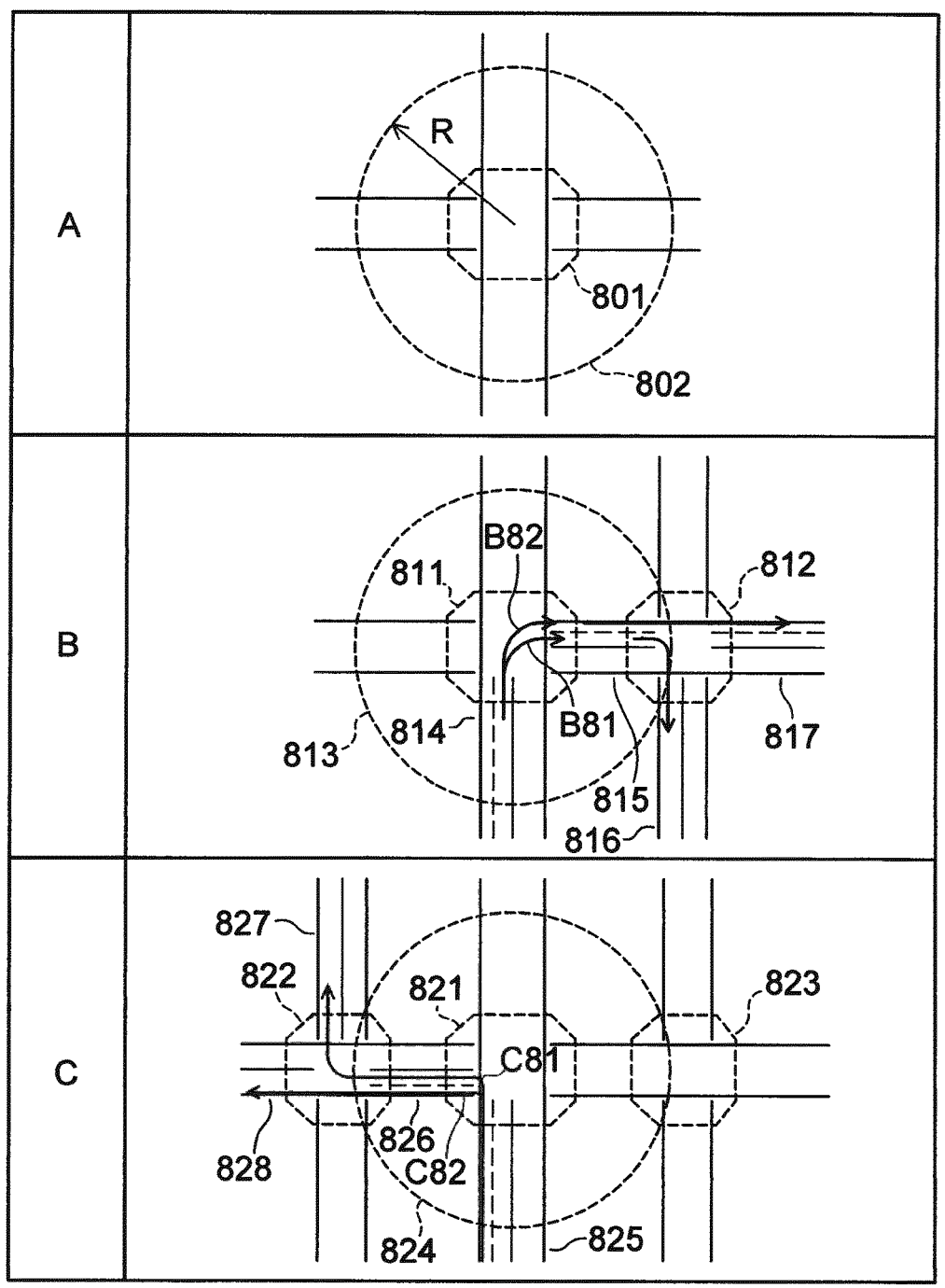
FIG. 7 is an explanatory view showing applications of inter-link correlation PF information.

FIG. 7 is an explanatory view showing applications of the inter-link correlation PF information. In these illustrated examples, multiple traffic intersections located within a distance 'R' are collectively processed as one 3D node.

In a case A, there is no other traffic intersection within a circle 802 with radius R from the center of one traffic intersection 801. In this case, the traffic intersection 801 alone is processed as one 3D node.

In a case B, there is another traffic intersection 812 within a circle 813 with radius R from the center of one traffic intersection 811. In this case, the two traffic intersections 811 and 812 are processed as one 3D node. A road 815 located between these two traffic intersections 811 and 812 is also correlated to this 3D node.

In the case B, it is assumed that the vehicle approaches from a road 814 to the traffic intersection 811, turns right at the traffic intersection 811, and further turns right at the next traffic intersection 812. In this situation, the vehicle is expected to enter a right lane on the road 815 after the right turn at the traffic intersection 811 in preparation for the subsequent right turn at the next traffic intersection 812, as shown by an arrow B81. When the vehicle goes straight at the next traffic intersection 812, on the other hand, the vehicle is expected to enter a left lane on the road 815 after the right turn at the traffic intersection 811, as shown by an arrow B82.

In the case of correlation of the two traffic intersections 811 and 812 to one 3D node, the route of turning right at the traffic intersection 812 approaches from the road 814 to the 3D node and exits from the 3D node to a road 816. The inter-link correlation PF information with regard to the 3D node in this situation is thus generated by specifying the 3D link IDs corresponding to the road 814 and the road 816 respectively as the approach 3D link information and the exit 3D link information and specifying the route entering the right lane on the road 815 (shown by the arrow B81) as the PF link sequence information. The route of going straight at the traffic intersection 812 approaches from the road 814 to the 3D node and exits from the 3D node to a road 817. The inter-link correlation PF information with regard to the 3D node in this situation is thus generated by specifying the 3D link IDs corresponding to the road 814 and the road 817 respectively as the approach 3D link information and the exit 3D link information and specifying the route entering the left lane on the road 815 (shown by the arrow B82) as the PF link sequence information.

Only one PF link is generally set corresponding to the road 815. The arrows B81 and B82 are thus given in this stage to simply express the route passing through the road 815 without discrimination between the right lane and the left lane. The technique of this embodiment, however, correlates the two traffic intersections 811 and 812 to one 3D node and thereby enables the arrows B81 and B82 to be defined to express the different routes passing through the 3D node. Different pieces of the guiding line shape data can thus be assigned to the arrow B81 and to the arrow B82 as described later. This arrangement assures the route guidance passing through the road 815 with discrimination between the right lane and the left lane.

In a case C, there are two other traffic intersections 822 and 823 within a circle 824 with radius R from the center of one traffic intersection 821. In this case, the three traffic intersections 821 through 823 are processed as one 3D node. A road 826 and another road located between these three traffic intersections 821 through 823 are also correlated to this 3D node.

In the case C, when the vehicle approaches from a road 825 to the traffic intersection 821 and turns right, the possible passage behaviors of the vehicle are identical with those in the case B discussed above. The illustration and the explanation in these situations are thus omitted.

In the case C, it is assumed that the vehicle approaches from the road 825 to the traffic intersection 821, turns left at the traffic intersection 821, and further turns right at the next traffic intersection 822. In this situation, the vehicle is expected to enter a right lane on the road 826 after the left turn at the traffic intersection 821 in preparation for the subsequent right turn at the next traffic intersection 822, as shown by an arrow C81. When the vehicle goes straight at the next traffic intersection 822, on the other hand, the vehicle is expected to enter a left lane on the road 826 after the left turn at the traffic intersection 821, as shown by an arrow C82.

In the case of correlation of the three traffic intersections 821 through 823 to one 3D node, the route of turning right at the traffic intersection 822 approaches from the road 825 to the 3D node and exits from the 3D node to a road 827. The inter-link correlation PF information with regard to the 3D node in this situation is thus generated by specifying the 3D link IDs corresponding to the road 825 and the road 827 respectively as the approach 3D link information and the exit 3D link information and specifying the route entering the right lane on the road 826 (shown by the arrow C81) as the PF link sequence information.

As described above, the technique of this embodiment can process multiple traffic intersections as one 3D node. In the illustrated examples of FIG. 7, the distance R used as the criterion for determining whether multiple traffic intersections are to be processed as one 3D node may be set arbitrarily within a certain effective range where discrimination of multiple lanes after passage of a traffic intersection is expected to be effective.

It may also be arbitrarily set whether multiple traffic intersections are to be processed as one 3D node. Multiple traffic intersections located within the radius R may be correlated respectively to different 3D nodes.

(5) Combinational Inter-Link Correlation PF Information

With referring to FIG. 6, the combinational inter-link correlation PF information is described below. The inter-combination link correlation PF information includes a 'via 3D link information sequence' and a 'pointer information sequence to inter-link correlation PF information'. The combinational inter-link correlation PF information is used to specify a route that passes through another traffic intersection in preparation for passing through one traffic intersection correlated to one 3D node. The combinational inter-link correlation PF information may thus be specified as information required for collective processing of multiple traffic intersections.

Figure 8:
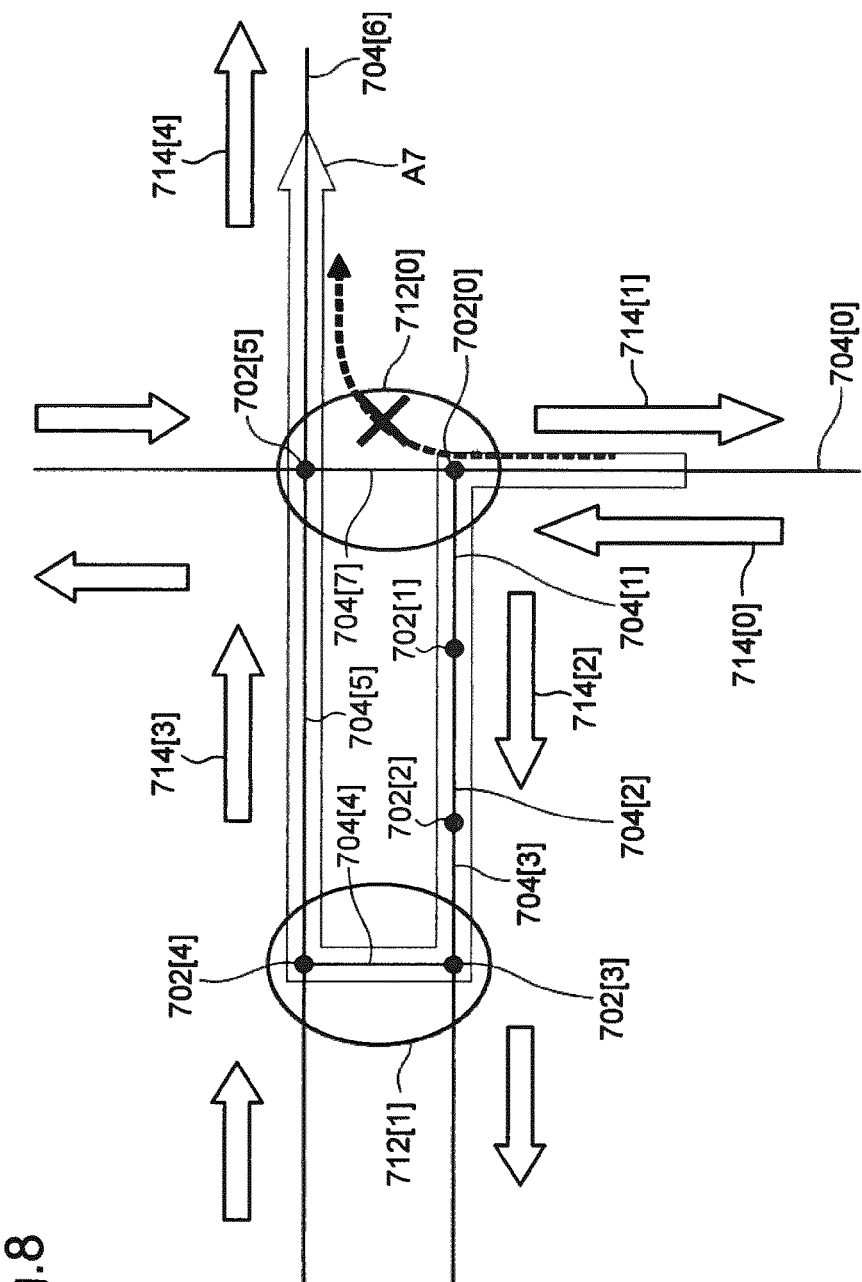
FIG. 8 is an explanatory view showing the outline of combinational inter-link correlation PF information.

FIG. 8 is an explanatory view showing the outline of the combinational inter-link correlation PF information. In this illustrated example, 3D links 714 are set in a neighborhood of two traffic intersections respectively expressed with 3D nodes 712[0] and 712[1]. The 3D nodes 712 and the 3D links 714 are correlated to PF nodes 702 and PF links 704.

It is assumed that a traffic rule of 'right turn prohibition' is set for the traffic intersection expressed with the 3D node 712[0] on a route approaching from a 3D link 714[0] to the 3D node 712[0] and exiting from the 3D node 712[0] to a 3D link 714[4]. In this situation, the vehicle should take a detour route of an arrow A7 going through the adjacent traffic intersection expressed with the 3D node 712[1] to follow the specified route. The detour route is expressible by the following sequence of 3D links.

3D link 714[0]→3D link 714[2]→3D link 714[3]→3D link 714[4]

As explained previously with reference to FIG. 6, 3D links are correlated to PF links and PF nodes. The 3D links in this sequence are thus also correlated to PF links and PF nodes.

As the 3D link 714[2] seems to be not connected with but separate from the 3D link 714[3], the detour route goes through the 3D node 712[1] between these 3D links 714[2] and 714[3]. With a view to correlating the detour route to sequences of PF nodes and PF links, it is preferable to refer to the inter-link correlation PF information with regard to the 3D node 712[1]. For this purpose, a pointer representing the storage location of the inter-link correlation PF information with regard to the 3D node 712[1] in the detour route should be stored in the combinational inter-link correlation PF information.

The storage of these pieces of information as the combinational inter-link correlation PF information enables the correlation of the detour route going through another 3D node to PF links and PF nodes to be specified as shown by the arrow A7 in FIG. 8.

The three-dimensional road network of this embodiment is constructed to have the data structure discussed above. This data structure generates the three-dimensional road network consisting of 3D links and 3D nodes correlated to PF links and PF nodes on the two-dimensional road network (PF network).

B3. Structure of Guiding Line Database (1) Structure of Region

The structure of the guiding line database is described below. The guiding line shape data is used to generate a guidance display in conformity with the actual passage behavior based on the result of a route search.

In this embodiment, the guiding line shape data are generated with regard to respective types of regions set according to the positional relation to a traffic intersection.

Figure 9:
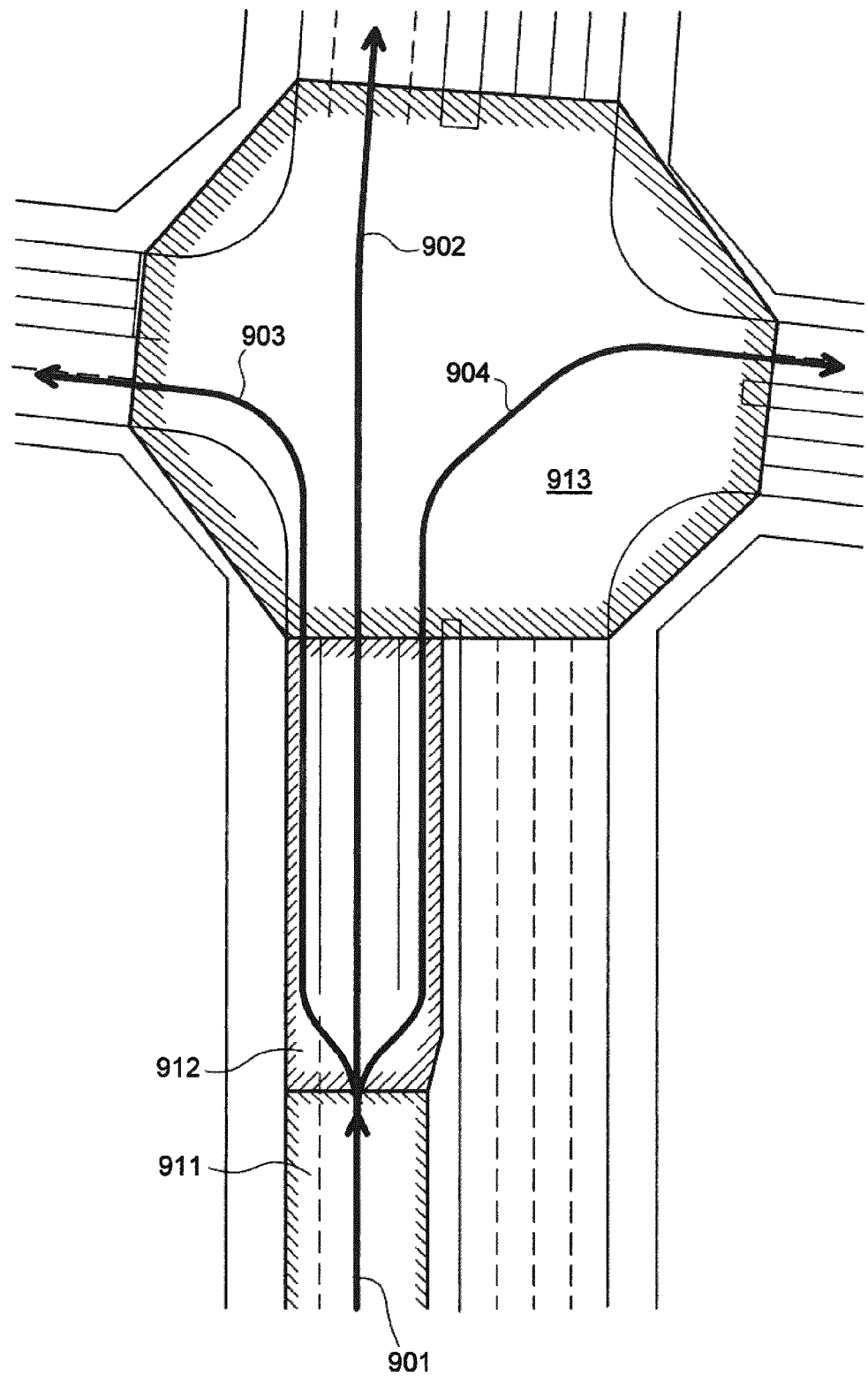
FIG. 9 is an explanatory view showing the structure of various regions.

FIG. 9 is an explanatory view showing the structure of various regions. Arrows 901 through 903 represent guiding lines. One guiding line is set at a location away from a traffic intersection to guide the center of a road or a representative lane of the road. This range is defined as a route region 911.

In the neighborhood of a traffic intersection, the guiding line is branched off to multiple guiding lines to guide a preparatory lane change according to an expected passage behavior at the traffic intersection, going straight, turning right, or turning left. This range where the guiding line is branched off to multiple guiding lines before a traffic intersection is defined as a connection region 912. It is not essential to provide the connection region 912 before the traffic intersection. Some traffic intersections may not require any preparatory branching of the guiding line. On such occasions, the connection region 912 may be omitted.

The connection region 912 may be set as an adequate range for a lane change with regard to each traffic intersection, based on the attributes of an approach road to the traffic intersection, for example, the number of lanes, the speed limit, and the presence of an exclusive lane for a right turn or an exclusive lane for a left turn. On a road with a number of lanes or on a road with a high speed limit, a relatively long range is preferable for the connection region 912 to assure enough time for a lane change. On a road with an exclusive lane for a right turn or an exclusive lane for a left turn, on the other hand, a relatively short range slightly before a point for entering the exclusive lane is sufficient for the connection region 912.

In a traffic intersection, guiding lines 902, 903, and 904 are set corresponding to the respective passage behaviors, going straight, turning left, and turning right. This range corresponding to the traffic intersection is defined as an intersection region 913. The intersection region 913 corresponds to a 3D node correlated to a traffic intersection. In the case of correlation of multiple traffic intersections to one 3D node like the illustrated examples of FIG. 7, a range including the multiple traffic intersections is defined as one intersection region.

The information regarding each region with assignment of guiding line shape data is effectively used for the route guidance as discussed later. The three different types of regions discussed above are only illustrative but not restrictive in any sense. In one modification, the guiding line shape data may be set with regard to a greater number of different types of regions. In another modification, the guiding line shape data may be set without any classification into different types of regions.

(2) Guiding Line Database

Figure 10:
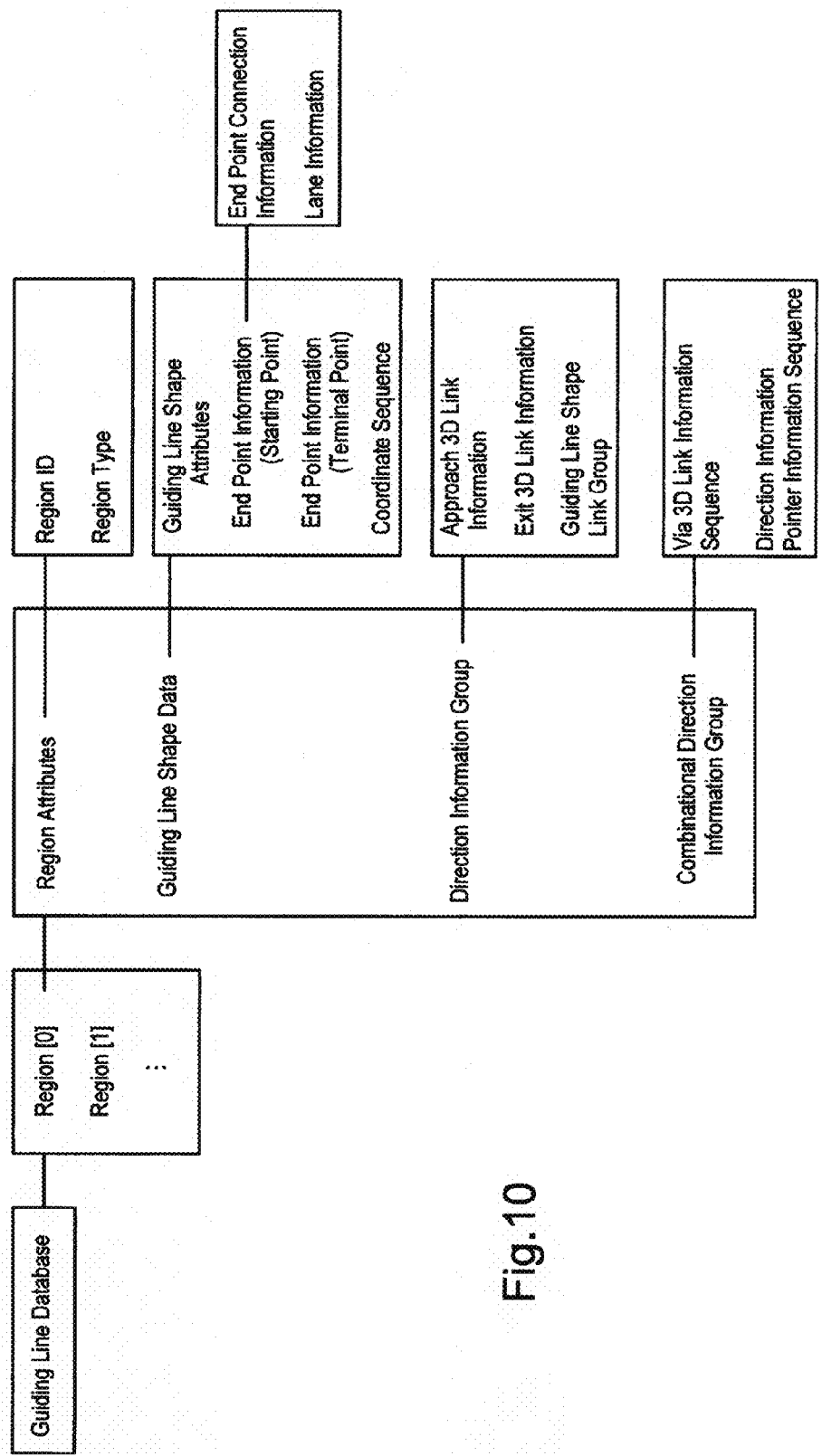
FIG. 10 is an explanatory view showing the data structure of a guiding line database.

FIG. 10 is an explanatory view showing the data structure of the guiding line database.

The guiding line database is provided with regard to the respective types of regions as mentioned previously. Each region includes 'region attributes', 'guiding line shape data', a 'direction information group', and a 'combinational direction information group'.

These contents of the region are described below in detail.

(2-1) Region Attributes

The region attributes include a 'region ID' and a 'region type'. The region ID is an identifier unequivocally assigned to each region. The region type is information identifying the type of each region, for example, the route region, the connection region, or the intersection region.

(2-2) Guiding Line Shape Data

The guiding line shape data include 'guiding line shape attributes', 'end point information (starting point)' end point information (terminal point)', and 'coordinate sequence'.

The guiding line shape attributes include a 'guiding line shape ID', a 'guiding line type', a 'main guiding line', a 'guiding line shape non-compliant zone', and a 'road structure-dependent type zone'.

The guiding line shape ID is identification information unequivocally assigned to each piece of guiding line shape data.

The guiding line type is set corresponding to each region type. In this embodiment, each guiding line in the intersection region is defined as an 'access link' Each guiding line in the route region is defined as a 'route link' Each guiding line in the connection region is defined as a 'connection link'.

The main guiding line is information specifying a representative guiding line among multiple guiding lines set in one region. In the illustrated example of FIG. 9, the three guiding lines 902, 903, and 904 are set in the connection region 912. One of these three guiding lines (for example, the guiding line 902 for going straight) is specified as the main guiding line.

The guiding line shape non-compliant zone is information specifying an area where a guidance display in three-dimensional representation is not available regardless of the presence of the guiding line shape data. One typical example of the guiding line shape non-compliant zone is an area where a three-dimensional model of buildings and other constructions has not yet been established.

The road structure-dependent type zone is information specifying a type dependent on a specific road structure, such as a tunnel or an elevated road, and a range of the specific road structure.

Each of the end point information (starting point) and the end point information (terminal point) includes 'end point connection information' and 'lane information'.

The end point connection information is used to specify another guiding line that is connected with an end point of one guiding line. This another guiding line is generally included in an adjacent region. A connection relation of guiding lines over multiple different regions can thus be specified by referring to the end point information.

The lane information represents the number of lanes at each end point.

The coordinate sequence represents a sequence of points constituting each guiding line. In this embodiment, each point is defined by three-dimensional coordinates including position coordinates and a height coordinate. Each guiding line is expressed as a line segment or a curve defined by the sequence of points.

Figure 11:
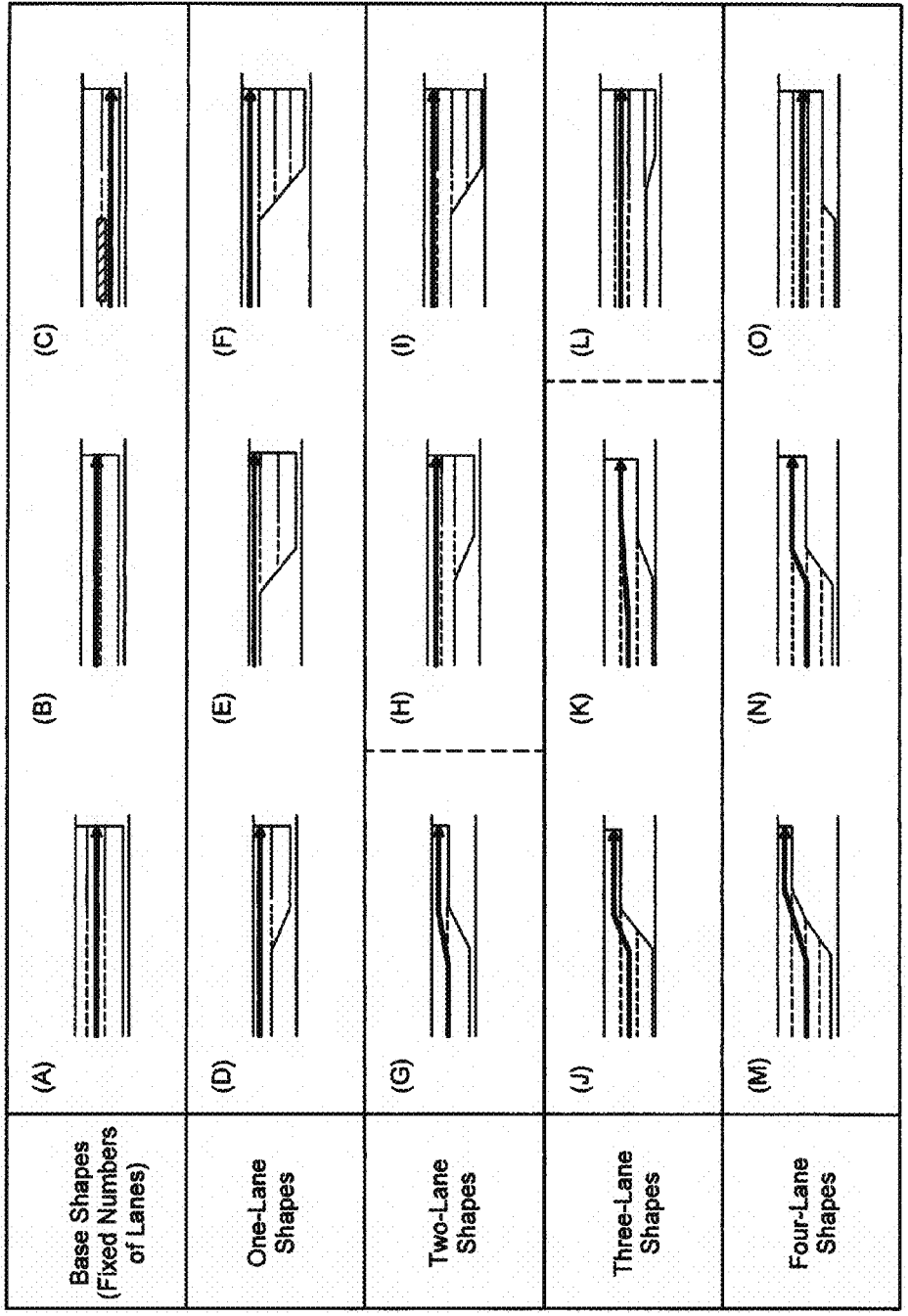
FIG. 11 is an explanatory view showing exemplary settings of guiding lines in various route regions.

FIG. 11 is an explanatory view showing exemplary settings of guiding lines in various route regions. Each of the route regions is relatively away from a traffic intersection. The guiding line in the route region has a relatively simple shape running along a road. The illustrated settings of the guiding lines are only illustrative and not at all restrictive. The guiding line may be set arbitrarily in each route region. In the respective examples of FIG. 11, only one guiding line is set in each route region. Multiple guiding lines may, however, be set according to the number of lanes. In the case of setting multiple guiding lines, one of the multiple guiding lines should be set as a main guiding line.

An uppermost row of FIG. 11 shows cases having fixed numbers of lanes as base shapes. A guiding line in a case A is set on a three-lane road section. The guiding line runs on a middle lane. A guiding line in a case B is set on a two-lane road section. The guiding line runs on the center of the two-lane road section, irrespective of the actual lanes. The guiding line is thus shown at a location deviated from the user's front, whether the vehicle runs on a right lane or a left lane of the two-lane road section. In either case, however, the deviation is about half the lane width. This arrangement accordingly assures a guidance display with reducing the user's feeling of strangeness. The guiding line may alternatively be set to run on the center of either the right lane or the left lane on the two-lane road section. A guiding line in a case B is set on a road section with some obstacle, such as a lane separator. The guiding line runs on an adequate lane to avoid the obstacle.

A second row shows cases having the increasing numbers of lanes from a one-lane road section to a two-lane road section (case D), to a three-lane road section (case E), and to a four-lane road section (case F). In any of these cases, a guiding line is set to keep an original lane, on which the vehicle runs in the one-lane road section. Any useless lane change should be avoided for the smooth and safe driving.

A third row shows cases having the varying numbers of lanes from a two-lane road section. The number of lanes decreases from the two-lane road section to a one-lane road section in a case G A guiding line is set to run on the center of the two-line road section like the base shape of the case B and to run on the center of a lane on the one-lane road section. Namely the guiding line is slightly shifted in position as in the case of a lane change with the decrease in number of lanes. The number of lanes increases from the two-lane road section to a three-lane road section in a case H and to a four-lane road section in a case I, respectively. In either of these cases, a guiding line is set to keep an original lane, on which the vehicle runs in the two-lane road section, even after the increase in number of lanes.

A fourth row shows cases having the varying numbers of lanes from a three-lane road section. The number of lanes decreases from the three-lane road section to a one-lane road section in a case J and to a two-lane road section in a case K, respectively. In this case, a guiding line is slightly shifted in position as in the case G. The number of lanes increases from the three-lane road section to a four-lane road section in a case L. In this case, a guiding line is set to keep an original lane, on which the vehicle runs in the three-lane road section, even after the increase in number of lanes.

A fifth row shows cases having the varying numbers of lanes from a four-lane road section. The number of lanes decreases from the four-lane road section to a one-lane road section in a case M and to a two-lane road section in a case N, respectively. In either of these cases, a guiding line is slightly shifted in position. The number of lanes also decreases from the four-lane road section to a three-lane road section in a case O. A guiding line in the case O is, however, set to keep an original lane, on which the vehicle runs in the four-lane road section, even after the decrease in number of lanes to the three-lane road section. Namely a straight guiding line without any positional shift can be set, regardless of the decrease in number of lanes in the case O.

Figure 12:
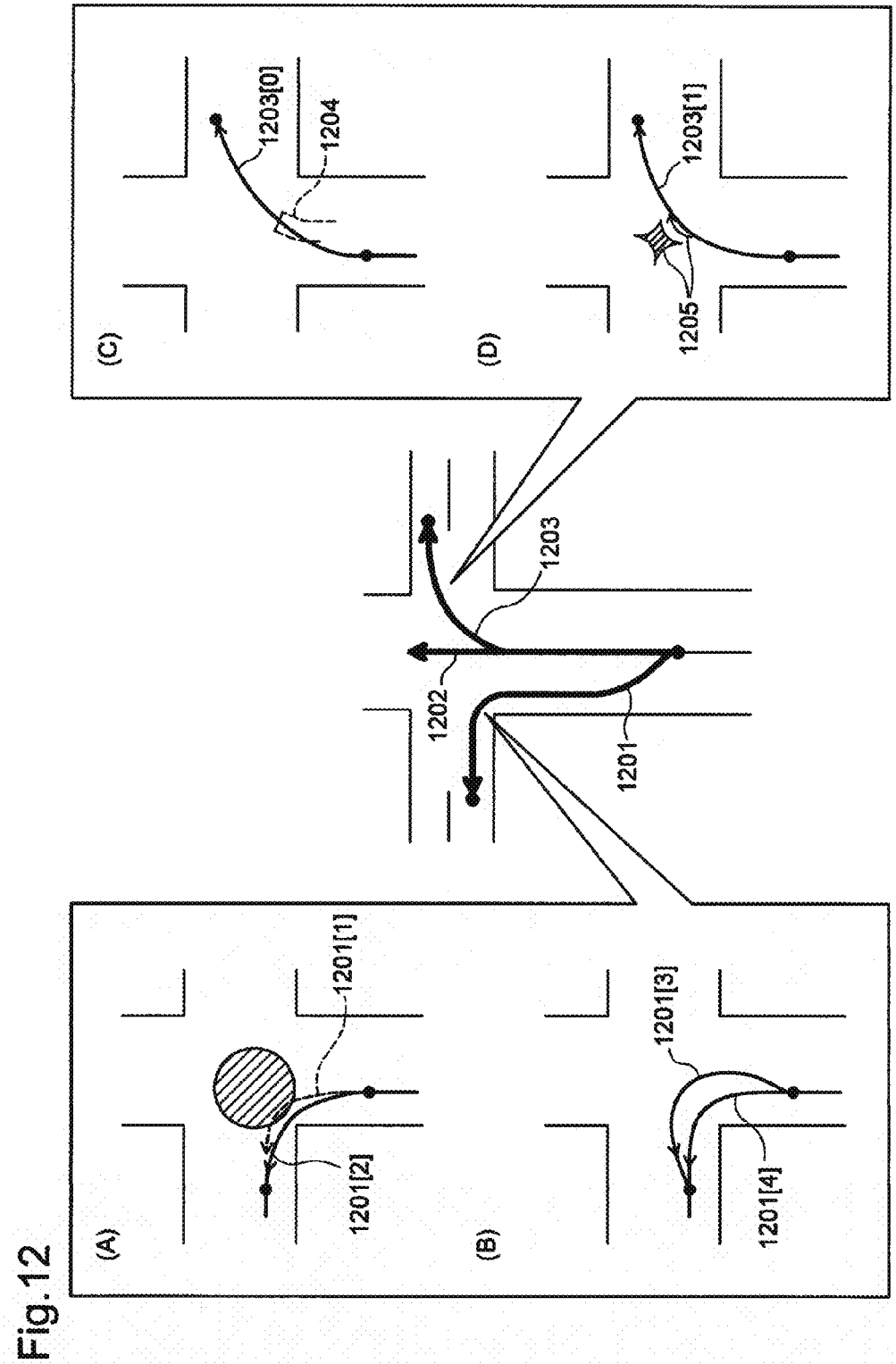
FIG. 12 is an explanatory view showing exemplary settings of guiding lines in a connection region and in an intersection region.

FIG. 12 is an explanatory view showing exemplary settings of guiding lines in a connection region and in an intersection region.

As shown in the center drawing, a guiding line is branched off to multiple guiding lines prior to a traffic intersection according to the available passage behaviors in the traffic intersection, going straight, turning left, and turning right. In this illustrated example, a left-turn guiding line 1201 is shifted to a left lane, while a straight guiding line 1202 and a right-turn guiding line 1203 are set on a right lane. In a road having three or a greater number of lanes each way, a straight guiding line, a left-turn guiding line, and a right-turn guiding line may be set on different lanes. In the connection region, a guiding line is not set on the center of the road section irrespective of the actual lanes as in the route region but is set on one of the lanes on the road section according to the corresponding passage behavior. The connection region is set as an area for clearly guiding the user on a lane change.

The left drawing and the right drawing show possible guiding line shapes in the intersection region. The left drawing of cases A and B shows exemplary settings of left-turn guiding lines. In the presence of some obstacle expressed by a hatched area in a traffic intersection as in the case A, a guiding line should not be determined to collide with the obstacle like a guiding line 1201[1] but should be determined to go around the obstacle and smoothly change the direction like a guiding line 1201[2]. A lane to be entered after the left turn may be selected arbitrarily. In the absence of any obstacle in a traffic intersection as in the case B, on the other hand, the shape of a guiding line may be determined arbitrarily. A guiding line is, however, undesirably set to have a shape that abruptly changes the directions at an approach, at a center, and at an exit of a traffic intersection like a guiding line 1201[3]. A guiding line is desirably set to have a shape that smoothly connects with a guiding line approaching to a traffic intersection and with a guiding line exiting from the traffic intersection and gradually changes the direction like a guiding line 1201[4]. Namely the shape of a guiding line at a left turn in a traffic intersection should be determined by taking into account the positional relation to an obstacle and a change of the moving direction.

The right drawing shows exemplary settings of right-turn guiding lines. The shape of a guiding line at a right turn in a traffic intersection should also be determined by taking into account the positional relation to an obstacle and a change of the moving direction as in the case of the left turn discussed above. Further consideration on the positional relation to a painted road sign is preferable in the case of the right turn.

When a stop line 1204 at the right turn is painted on the road as in a case C, a guiding line is desirably set to have a shape that is substantially perpendicular to the painted stop line 1204 like a guiding line 1203[0]. In the presence of the painted stop line 1204, the user is expected to stop at the stop line 1204, prior to a right turn. When a right turn guide mark 1205 is painted close to the center of a traffic intersection as in a case D, a guiding line is desirably set to have a shape that follows the right turn guide mark 1205. Such setting of the guiding line gives the user a reasonable route guidance along an ordinary route that the user generally takes at the right turn.

Figure 13:
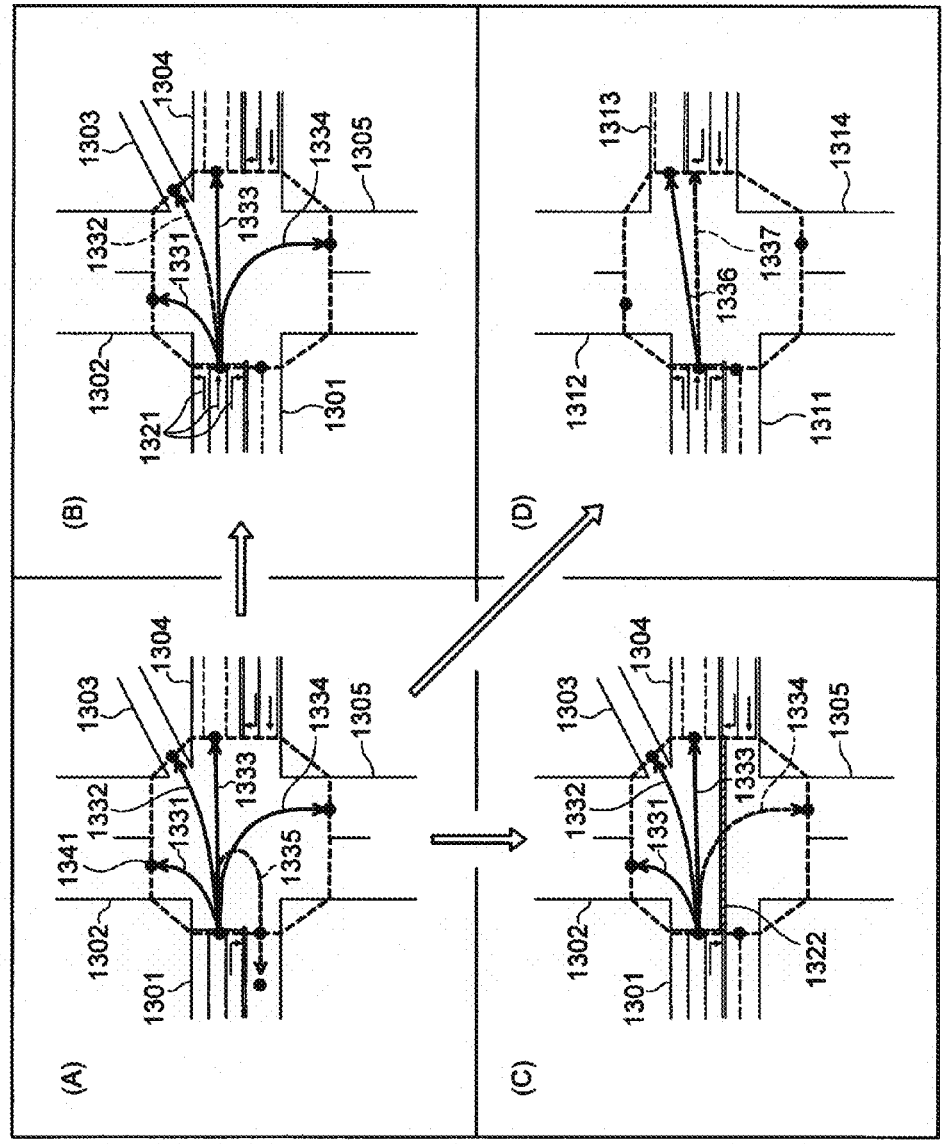
FIG. 13 is an explanatory view showing exemplary settings of guiding lines in various intersection regions.

FIG. 13 is an explanatory view showing exemplary settings of guiding lines in various intersection regions. These illustrated examples show guiding lines set in special traffic intersections, such as a junction of five roads. A broken line in each drawing represents a boundary of an intersection region.

In a case A, a road 1301 approaching to a traffic intersection has no road sign painted for traffic regulation at the traffic intersection. In this case, guiding lines are set for all the available moving directions. A guiding line 1331 is set for a route approaching from the road 1301 to the traffic intersection, turning left, and exiting from the traffic intersection to a road 1302. Similarly a guiding line 1332, a guiding line 1333, and a guiding line 1334 are respectively set in this intersection region for a route going obliquely leftward to a road 1303, a route going straight to a road 1304, and a route turning right to a road 1305. When the intersection region is a U-turns allowed zone, another guiding line 1335 may be set. In a U-turn prohibited intersection region, the guiding line 1335 cannot be set.

The guiding line 1331 in the traffic intersection ends at a boundary point 1341 of the intersection region and connects with a guiding line set on a route region of the road 1302. The other guiding lines also have such terminal points and connections.

In a case B, the road 1301 has a painted road sign 1321 for traffic regulation. The painted road sign 1321 includes a left turn arrow, a straight arrow, and a right turn arrow but does not include an arrow going obliquely leftward to the road 1303. In the case B, the guiding line 1332 going obliquely leftward to the road 1303 should be omitted from the guiding lines set in the case A. The U-turn guiding line 1335 is omitted from the illustration of the case B. The guiding line 1335 may be set in a U-turn allows intersection region.

In a case C, an intersection region has a center divider 1322. This traffic intersection is a right turn prohibited zone, since the center divider 1322 works as an obstacle. In the case C, the guiding line 1334 turning right to the road 1305 should be omitted from the guiding lines set in the case A.

In a case D, an intersection region is set for a traffic intersection of four crossroads 1311 through 1314. The centerline of the road 1311 approaching to the traffic intersection is, however, not aligned with the centerline of the road 1313 going straight to exit from the traffic intersection. In this case, if a guiding line set on the center of the road 1311 goes straight in the traffic intersection, the guiding line enters an opposing line of the road 1313 like a guiding line 1337. At the traffic intersection of such crossroads, a guiding line 1336 for a straight route should accordingly be set to run obliquely in the traffic intersection and go toward the center of the road 1313 exiting from the traffic intersection.

As explained above, guiding lines cannot be set uniformly even in straight road sections without no forks or in traffic intersections. The technique of this embodiment sets guiding lines, which are uniform wherever possible, according to the actual passage behaviors in conformity with the various rules, such as those shown in FIGS. 11 through 13. Guiding lines are basically settable in any arbitrary manner. The shapes of guiding lines may be determined in conformity with diversity of other rules in addition to those shown in FIGS. 11 through 13 or with omission of part of the rules shown in FIGS. 11 through 13.

(2-3) Direction Information Group

Referring back to FIG. 10, the contents of the direction information ground are described below. The direction information group includes pieces of information on combinations of 3D links corresponding to respective regions or 3D links approaching to respective regions with 3D links to be passed after passage of respective regions and is used to specify guiding lines, which are to be shown on a guidance display. The direction information group includes 'approach 3D link information', 'exit 3D link information', and a 'guiding line shape link group'. The contents of these pieces of information depend on the region type.

In route regions and connection regions, the approach 3D link information stores a 3D link ID assigned to a 3D link corresponding to each region (hereafter referred to as 'approach 3D link'). The exit 3D link information stores a 3D link ID assigned to a 3D link to be passed after passage of a 3D node located at the exit of each region (hereafter referred to as 'exit 3D link').

In intersection regions, the approach 3D link information stores a 3D link ID assigned to a 3D link approaching to each region (hereafter referred to as 'approach 3D link) The exit 3D link information stores a 3D link ID assigned to a 3D link exiting from each region (hereafter referred to as 'exit 3D link'). Each intersection region is generally approachable from different directions and generally has different exit directions according to the available passage behaviors at the traffic intersection, for example, going straight, turning right, and turning left. Namely multiple sets of the approach 3D link information and the exit 3D link information are generally provided for each intersection region.

The guiding line shape link group stores information used to specify guiding line shape data corresponding to each combination of the approach 3D link information and the exit 3D link information as an index. In this embodiment, a pointer representing the storage location of each piece of guiding line shape data is used as the information stored in the guiding line shape link group.

Figure 14:
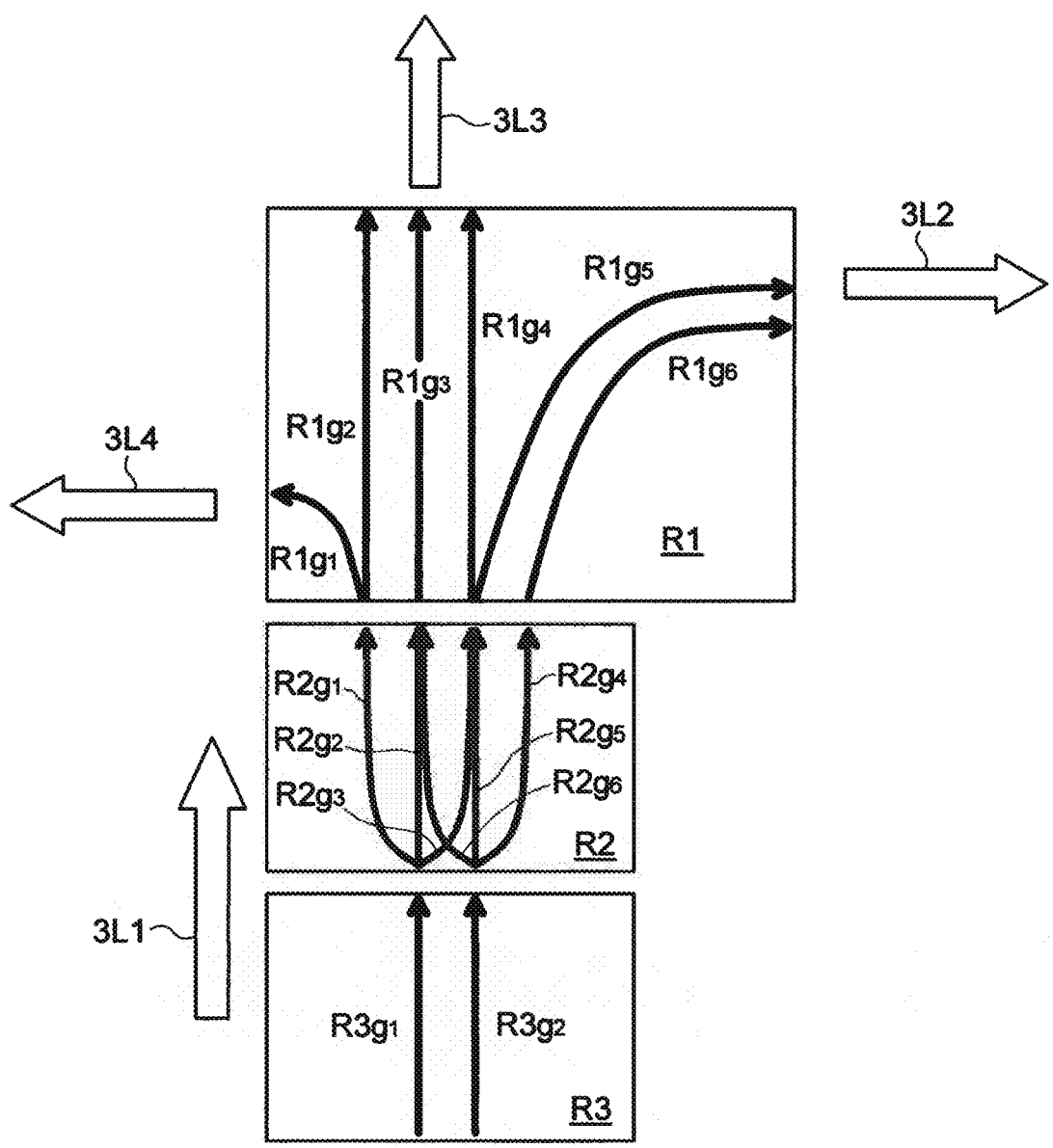
FIG. 14 is an explanatory view showing exemplary settings of direction information.

FIG. 14 is an explanatory view showing exemplary settings of the direction information.

This illustrated example includes an intersection region R1, a connection region R2, a route region R3, and 3D links 3L1 through 3L4. The 3D link 3L1 corresponds to the route region R3 and is specified as the approach 3D link. The exit 3D link is selectable among the remaining three 3D links 3L2 through 3L4 located after the intersection region R1.

On selection of the 3D link 3L4 as the exit 3D link in the route region R3, the route guidance uses a guiding line R3g1 in the route region R3, a guiding line R2g1 in the connection region R2, and a guiding line R1g1 in the intersection region R1. In this case, the following pieces of information are accordingly stored as the direction information of the route region R3:

Approach 3D link=3L1, Exit 3D link=3L4, Guiding line shape link group=a pointer representing the guiding line R3g1.

On selection of the 3D link 3L3 as the exit 3D link in the route region R3, the route guidance may use either the guiding line R3g1 or another guiding line R3g2. In this case, the following pieces of information are accordingly stored as the direction information:

Approach 3D link=3L1, Exit 3D link=3L3, Guiding line shape link group=a pointer representing the guiding line R3g1 and a pointer representing the guiding line R3g2.

On selection of the 3D link 3L2 as the exit 3D link in the route region R3, two guiding lines R3g1 and R2g2 are set as the direction information.

The 3D link 3L1 also corresponds to the connection region R2 and is specified as the approach 3D link. The exit 3D link is selectable among the remaining three 3D links 3L2 through 3L4.

On selection of the 3D link 3L4 as the exit 3D link in the connection region R2, the route guidance uses the guiding line R2g1 in the connection region R2. In this case, the following pieces of information are accordingly stored as the direction information:

Approach 3D link=3L1, Exit 3D link=3L4, Guiding line shape link group=a pointer representing the guiding line R2g1.

On selection of the 3D link 3L3 as the exit 3D link in the connection region R2, the guiding line shape link group stores pointers representing respective guiding lines R2g1, R2g2, R2g3, R2g5, and R2g6.

On selection of the 3D link 3L2 as the exit 3D link in the connection region R2, the guiding line shape link group stores pointers representing respective guiding lines R2g3 through R2g5.

The intersection region R1 is approachable from the 3D link 3L1. The 3D link 3L1 is accordingly specified as the approach 3D link. The exit 3D link is selectable among the remaining 3D links 3L2 through 3L4.

On selection of the 3D link 3L4 as the exit 3D link, the guiding line shape link group stores a pointer representing the guiding line R1g1. On selection of the 3D link 3L3 as the exit 3D link, the guiding line shape link group stores pointers representing respective guiding lines R1g2 through R1g4. On selection of the 3D link 3L2 as the exit 3D link, the guiding line shape link group stores pointers representing respective guiding lines R1g5 and R1g6.

As explained above, the direction information is set to determine the guiding line shape data usable in the route guidance under the condition of specification of the approach 3D link and the exit 3D link with regard to each region. In the illustrated example of FIG. 14, a number of guiding lines are correlated to the respective combinations of the approach 3D link and the exit 3D link. The shapes of and the number of guiding lines may be set arbitrarily. Only one guiding line may be correlated to each combination of the approach 3D link and the exit 3D link.

(2-4) Combinational Direction Information Group

Referring back to FIG. 10, the contents of the combinational direction information group are explained below. The combinational direction information group includes pieces of information used to specify guiding lines to be displayed for the route guidance passing through multiple traffic intersections that are not processed as one identical 3D node as in the case of FIG. 8. The combinational direction information group includes a 'via 3D link information sequence' and a 'direction information pointer information sequence'.

The via 3D link information sequence is defined as an array of 3D link IDs respectively assigned to 3D links corresponding to a route passing through multiple different traffic intersections. The direction information pointer information sequence includes pieces of information used to obtain guiding line shape data corresponding to the via 3D link information sequence with regard to the respective regions located on the route. In this embodiment, pointers representing the storage locations of the direction information with regard to the 3D links included in the via 3D link information sequence are stored as the direction information pointer information sequence of the respective regions.

The guiding line database of this embodiment has the data structure explained above. The data structure of the guiding line database allows for storage of the guiding line shape data in relation to the 3D links and 3D nodes on the three-dimensional road network (3D network). The 3D network is related to the two-dimensional road network (PF network). Namely the guiding line shape data is indirectly related to the PF network. Such relations enable the guiding line shape data to be specified for a route guidance, based on the sequence of PF links and PF nodes given as the result of a route search.

This embodiment adopts the data structure of using the 3D network as the intermediate data. One modified application may adopt the data structure of directly relating the PF links and PF nodes to the guiding line shape data.

Figure 15:
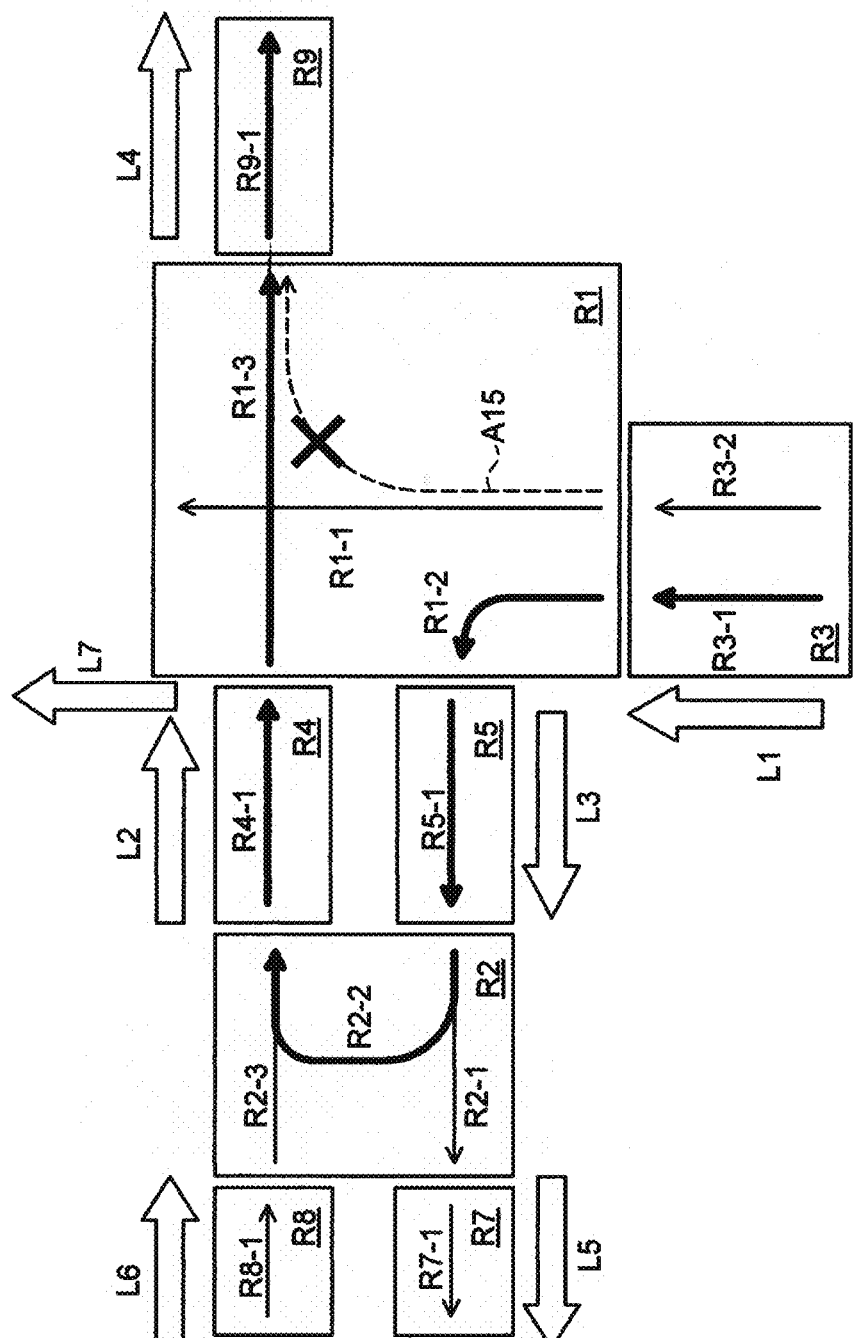
FIG. 15 is an explanatory view showing exemplary settings of a combinational direction information group.

FIG. 15 is an explanatory view showing exemplary settings of the combinational direction information group. This illustrated example includes two different intersection regions R1 and R2 and route regions R3 through R9. Arrows in the respective regions represent guiding lines, and open arrows L1 through L7 represent 3D links.

An expected route approaches from the 3D link L1 to the intersection region R1 and exits from the intersection region R1 to the 3D link L4. As shown by an arrow A15, however, the intersection region R1 is a right turn prohibited zone.

In this case, one available route is set to turn left at the intersection region R1, enter the 3D link L3, turn around at the intersection region R2, enter the 3D link L2, go straight at the intersection region R1, and enter the 3D link L4. The combinational direction information group includes pieces of information guiding such a route passing through multiple different traffic intersections.

The via 3D link information sequence stores the array of 3D links to be passed through on this available route, 'L1→L3→L2→L4'.

The direction information pointer information sequence of the respective regions stores pointers representing the storage locations of the direction information with regard to the 3D links on the route as follows:

Route region R3 (Approach 3D link=L1, Exit 3D link=L3): Guiding line=R3-1

Intersection region R1 (Approach 3D link=L1, Exit 3D link=L3): Guiding line=R1-2

Route region R5 (Approach 3D link=L3, Exit 3D link=L2): Guiding line=R5-1

Intersection region R2 (Approach 3D link=L3, Exit 3D link=L2): Guiding line=R2-2

Route region R4 (Approach 3D link=L2, Exit 3D link=L4): Guiding line=R4-1

Intersection region R1 (Approach 3D link=L2, Exit 3D link=L4): Guiding line=R1-3

The route approaching from the 3D link L1, going around the adjacent intersection region R2, and exiting to the 3D link L4 can be guided with the above sequence of the guiding lines by sequentially referring to this combinational direction information.

B4. Exemplary Settings of Route Guidance Data

Figure 16:
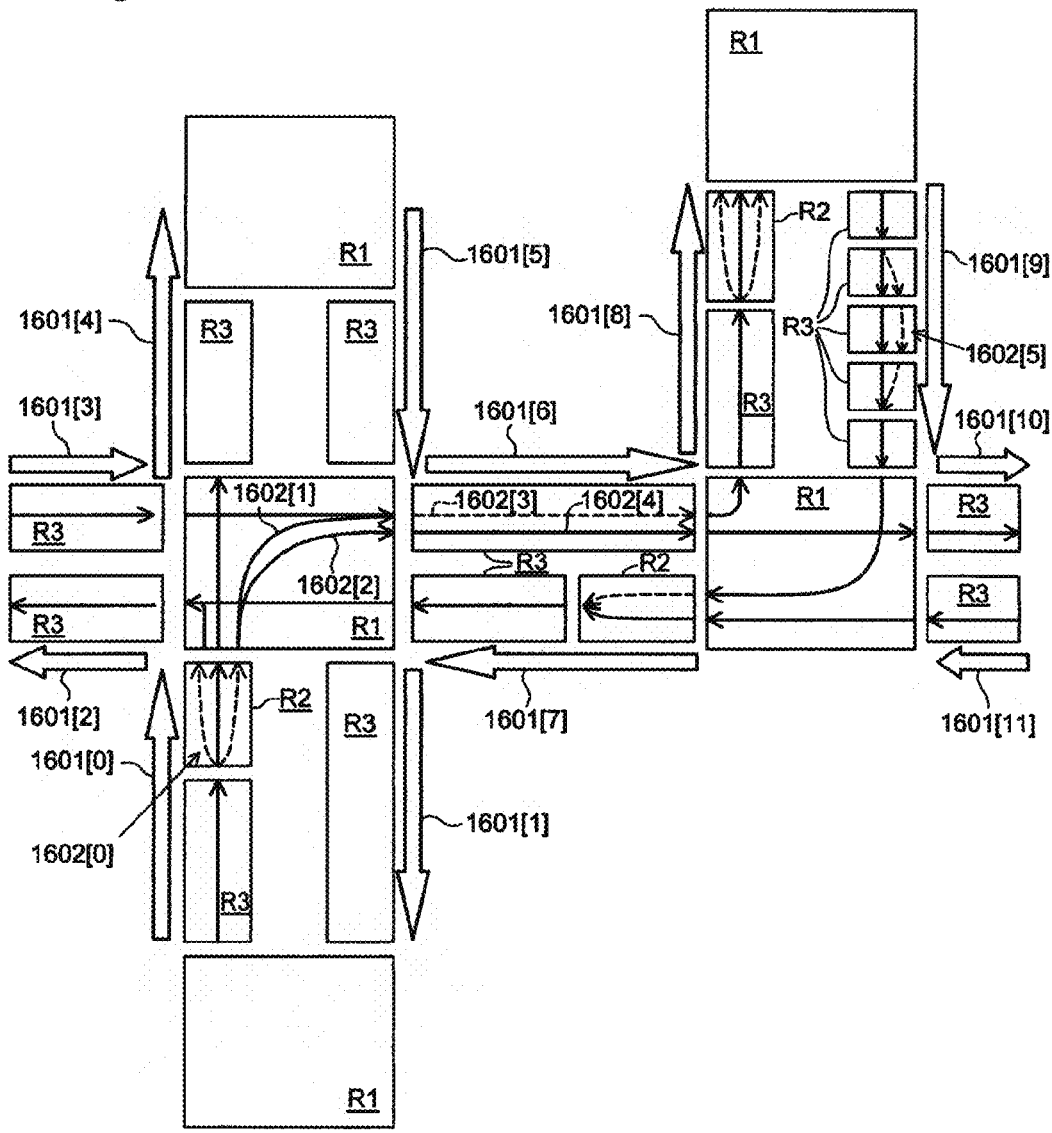
FIG. 16 is an explanatory view showing exemplary settings of route guidance data.

FIG. 16 is an explanatory view showing exemplary settings of route guidance data. In this illustrated example, the route guidance data includes the settings of an intersection region R1, a connection region R2, and a route region R3. Open arrows 1601 represent 3D links, and arrows 1602 in the respective regions represent guiding lines. For the purpose of clear understanding, the illustration includes only part of the guiding lines, and numerical symbols that are not referred to for explanation are omitted from the illustration.

In each area of a route region or a connection region with settings of multiple guiding lines, such as guiding lines 1602[0], 1602[3], 1602[4], and 1602[5], one of the guiding lines is specified as a main guiding line. In the illustrated example of FIG. 16, solid line arrows represent main guiding lines, and dotted line arrows represent sub-guiding lines. For example, the guiding line 1602[4] is specified as a main guiding line, and the guiding line 1602[3] is specified as a sub-guiding line. In the route region, guiding lines may be set on respective lanes like the guiding lines 1602[3] and 1602[4], or guiding lines may be set in a main lane and in a side path like the guiding line 1602[5].

In a connection region R2 of a 3D link 1601[0], a guiding line 1602[0] has a fork shape to be branched off to multiple guiding lines, each guiding an adequate lane change according to the passage behavior in the subsequent intersection region R1, going straight, turning right, or turning left. Left turn, straight, and right turn guiding lines are set with regard to the subsequent intersection region R1. In this illustrated example, two guiding lines are set as the right turn guiding lines: a guiding line 1602[1] connecting with the guiding line 1602[3] set on a left lane and a guiding line 1602[2] connecting with the guiding line 1602[4] set on a right lane. The guiding line 1602[1] is preferable for a route of turning right at the intersection region R1, entering the guiding line 1602[3], and turning left to a 3D link 1601[8]. The guiding line 1602[2] is preferable for a route of turning right at the intersection region R1, entering the guiding line 1602[4], and going straight to a 3D link 1601[10].

The technique of this embodiment sets guiding lines according to the actual passage behaviors and accordingly gives the user a reasonable route guidance. Using the three-dimensional road network of the 3D links and 3D nodes as the intermediate data enables guiding lines to be readily correlated to a route by taking into account the moving direction.

C. Generation Support System for Route Guidance Database

A generation support system for the route guidance database in accordance with the embodiment is explained below. The operator may manually specify the settings of the route guidance database with referring to the two-dimensional road network and the other relevant databases. At least partially adopting computer-aided automatic generation and automatic determination is preferable in the process of setting the route guidance database, with a view to relieving the operator's load and reducing potential errors. The generation support system discussed below is used to support the operator's manual settings of the route guidance database.

C1. System Configuration

Figure 17:
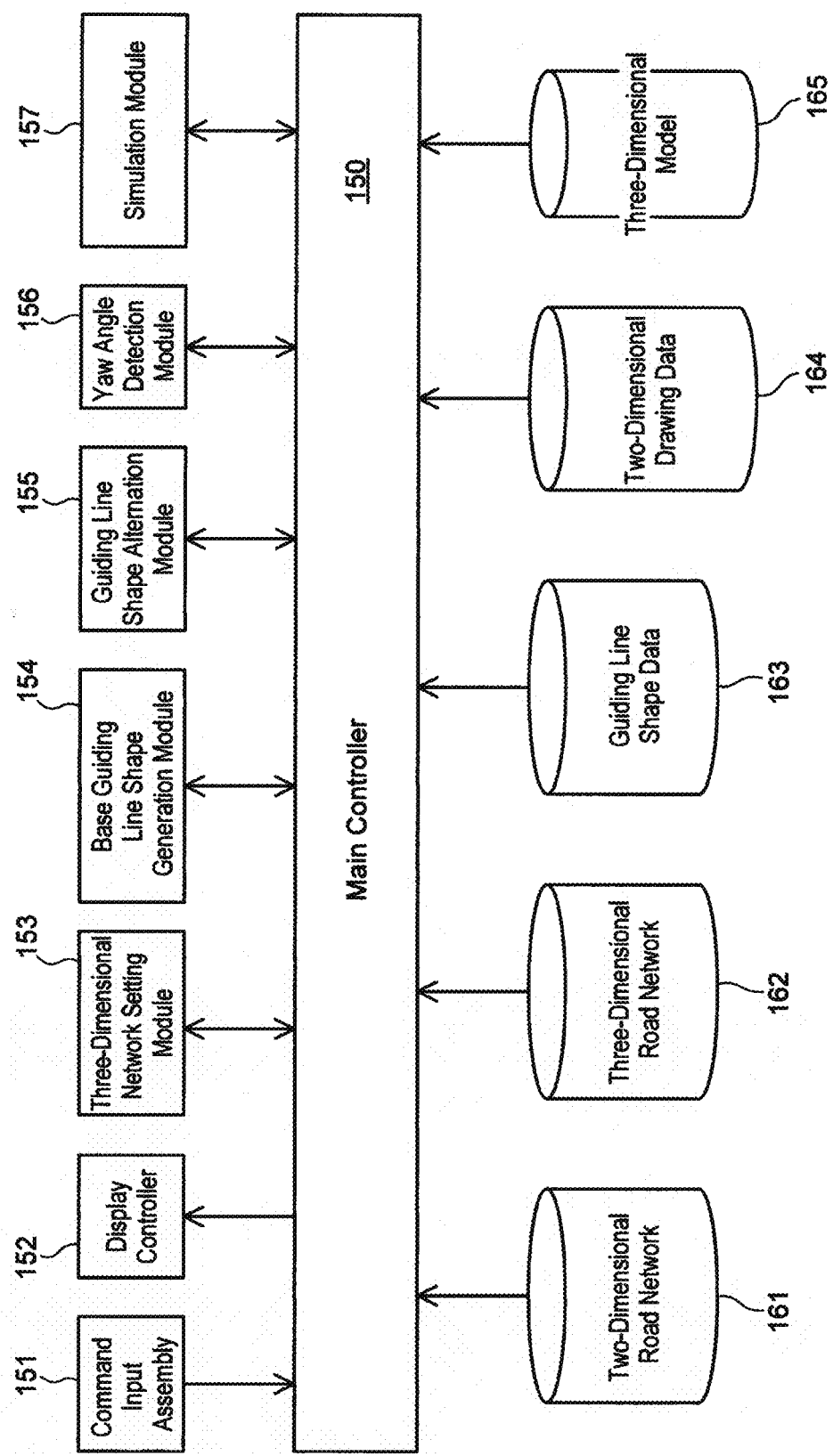
FIG. 17 is an explanatory view showing the system configuration of a generation support system.

FIG. 17 is an explanatory view showing the system configuration of the generation support system. In this embodiment, respective functional blocks are provided as the software configuration by installing computer programs relating to these functions in a general-purpose computer. Alternatively these functional blocks may be actualized by the hardware configuration.

The generation support system has five databases corresponding to the databases of the route guidance device (FIG. 1), a two-dimensional road network 161, a three-dimensional road network 162, guiding line shape data 163, two-dimensional drawing data 164, and a three-dimensional model 165. The three-dimensional road network 162 and the guiding line shape data 163 are structured as databases of generation objects by the generation support system to successively accumulate the relevant data in the course of generation.

A main controller 150 controls the operations of the whole generation support system. A command input assembly 151 functions to input the operator's commands through the operators' operations of a keyboard and a mouse of the computer. A display controller 152 generates display data to be shown on a display screen of the computer. At least part of the functions of the command input assembly 151 and the display controller 152 may be provided by an OS (operating system) installed in the computer.

A three-dimensional network setting module 153 functions to generate data of the three-dimensional road network 162, in response to the operator's instruction. For example, the three-dimensional network setting module 153 selects nodes and links in the two-dimensional road network 161 on a two-dimensional map shown on the display screen and generates 3D nodes and 3D links. The three-dimensional network setting module 153 also functions to set the approach 3D link information, the exit 3D link information, the PF link sequence information, and the combinational inter-link correlation PF information with regard to each 3D node (FIG. 6). The generated data and the set pieces of information are stored in the three-dimensional road network 162.

A base guiding line shape generation module 154 functions to generate initial guiding line shapes, based on the three-dimensional road network. The details of a base guiding line shape generation process will be discussed later.

A guiding line shape alteration module 155 functions to alter the guiding line shapes displayed on the two-dimensional map or newly generate guiding line shapes, in response to the operator's instruction. The guiding line shape alteration module 155 also functions to set the region attributes, the direction information group, and the combinational direction information group (FIG. 10). The operator alters the guiding line shapes generated by the base guiding line shape generation module 154 according to the requirements. This arrangement enables the operator to generate data of desired guiding line shapes with a relatively light load. The generated data and the set pieces of information are stored in the guiding line shape data 163.

A yaw angle detection module 156 functions to read data of guiding lines from the guiding line shape data 163 and detect a change in direction of each guiding line or a yaw angle. The detection of the yaw angle allows for extraction of any unnatural guiding line with an abrupt change in direction. The guiding line shape alternation module 155 may be activated to alter the guiding line shape extracted to be unnatural as the result of the yaw angle detection. The details of the processing by the yaw angle detection module 156 will be discussed later.

A simulation module 157 functions to generate a guidance display in three-dimensional representation, based on the data of guiding lines read from the guiding line shape data 163 and the three-dimensional model 165. The operator checks for any inadequate part of the guiding line shape data on the guidance display in three-dimensional representation. The details of the processing by the simulation module 157 will be discussed later.

C2. Base Guiding Line Shape Generation Process

Figure 18:
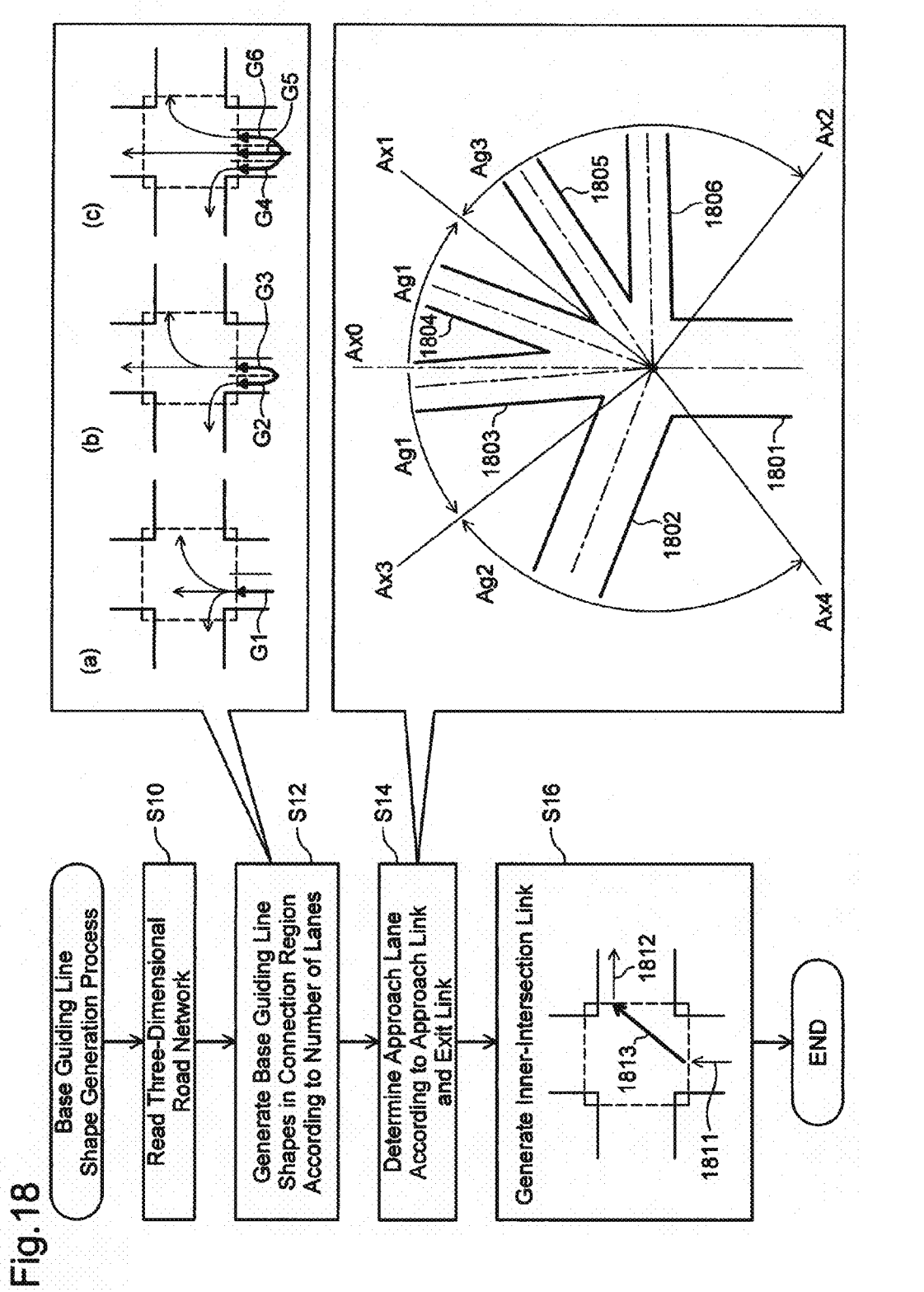
FIG. 18 is a flowchart showing a base guiding line shape generation process.

FIG. 18 is a flowchart showing a base guiding line shape generation process. A CPU of the computer configured as the generation support system performs this base guiding line shape generation process, which corresponds to the function of the base guiding line shape generation module 154 (FIG. 17).

At the start of the base guiding line shape generation process, the CPU reads the three-dimensional road network (step S10) and generates one or multiple base guiding line shapes in a connection region according to the number of lanes (step S12).

Examples of generating the base guiding line shapes at step S12 are shown in a box on the right side of the flowchart. A case 'a' shows a situation of approaching from a one-lane road section to a traffic intersection. There is no lane change in this situation. One guiding line G1 I thus set on the approach side. In the situation with no lane change, a region with the guiding line G1 is regarded as not a connection region but a route region.

A case 'b' shows a situation of approaching from a two-lane road section to a traffic intersection. A guiding line G2 for a lane change to a left lane in preparation for a subsequent left turn and a guiding line G3 for a lane change to a right lane in preparation for going straight or for a subsequent right turn are set in this situation. Alternatively a guiding line on the left lane may be set for a subsequent left turn or for going straight, and a guiding line on the right lane may be set for a subsequent right turn. One application may allow the operator to specify adequate lanes for going straight, turning left, and turning right and set guiding lines based on the operator's specification.

A case 'c' shows a situation of approaching from a three-lane road section to a traffic intersection. A guiding line G4 for a lane change to a left lane in preparation for a subsequent left turn, a guiding line G5 on the current lane in preparation for going straight, and a guiding line G6 for a lane change to a right lane in preparation for a subsequent right turn are set in this situation. One application may allow the operator to specify adequate lanes on the three-lane road section as in the case of the two-lane road section discussed above.

The CPU of the generation support system subsequently determines an approach lane according to an angle between a 3D link on the approach side and a 3D link on the exit side (step S14). In order to avoid the complex guiding line shapes, the system of this embodiment sets guiding lines separately corresponding to the three available passage behaviors, turning left, going straight, and turning right, in a connection region. Roads connecting with a traffic intersection should thus be classified according to these available passage behaviors, turning left, going straight, and turning right. Such classification is performed at step S14.

This processing step is especially effective for a traffic intersection with an obliquely crossing road.

An example of the processing at step S14 is shown in a box on the right side of the flowchart. In this illustrated example, five roads 1802 through 1806 are connected with an approach road 1801 across a traffic intersection. The system of this embodiment defines three different zones, a straight zone, a left turn zone, and a right turn zone according to the angle from the approach road 1801 or the 3D link on the approach side. As illustrated, an area between a leftward axis Ax3 and a rightward axis Ax1 both having an angle Ag1 to an axis Ax0 extended from the road 1801 is defined as the straight zone. An area between the axis Ax3 and an axis Ax4 having an angle Ag2 to the axis Ax3 is defined as the left turn zone. An area between the axis Ax1 and an axis Ax2 having an angle Ag3 to the axis Ax1 is defined as the right turn zone. The angles Ag1, Ag2, and Ag3 may be set to any suitable values and are respectively equal to 38 degrees, 90 degrees, and 90 degrees in this embodiment.

The system of this embodiment identifies the zone where each road is located by referring to the definition of the respective zones and determines the approach lane. For example, the road 1802 is located in the left turn zone and is thus to be connected with the guiding line set at step S12 in preparation for a subsequent left turn. In this case, the approach lane or the starting point of the guiding line to be set in the intersection region is equal to the terminal point of the guiding line set in the previous connection region in preparation for a subsequent left turn. Similarly the road 1803 and the road 1804 are located in the straight zone and are thus to be connected with the guiding line set at step S12 in preparation for going straight. The roads 1805 and 1806 are located in the right turn zone and are thus to be connected with the guiding line set at step S12 in preparation for a subsequent right turn.

After determining the approach lane, the CPU generates an inner-intersection link (step S16). The inner-intersection link represents a base guiding line shape in an intersection region. An example of the generated inner-intersection link is shown in the flowchart. In this illustrated example, a route approaches from a guiding line 1811 to a traffic intersection and exits from the traffic intersection to a guiding line 1812. The guiding line 1811 is equivalent to a guiding line corresponding to the approach lane determined at step S14. In this embodiment, the inner-intersection link generated as the base guiding line shape is a line segment 1813 connecting a terminal point of the guiding line 1811 on the approach side to a starting point of the guiding line 1812 on the exit side. The inner-intersection link generated as the base guiding line shape may alternatively be a curve of a predetermined curvature connecting the terminal point to the starting point.

The CPU specifies the base guiding line shapes according to the sequence of processing discussed above. The operator then alters the base guiding line shapes generated at steps S12 and S16 to specify the final settings of guiding lines used for route guidance.

C3. Yaw Angle Detection Process

Figure 19:
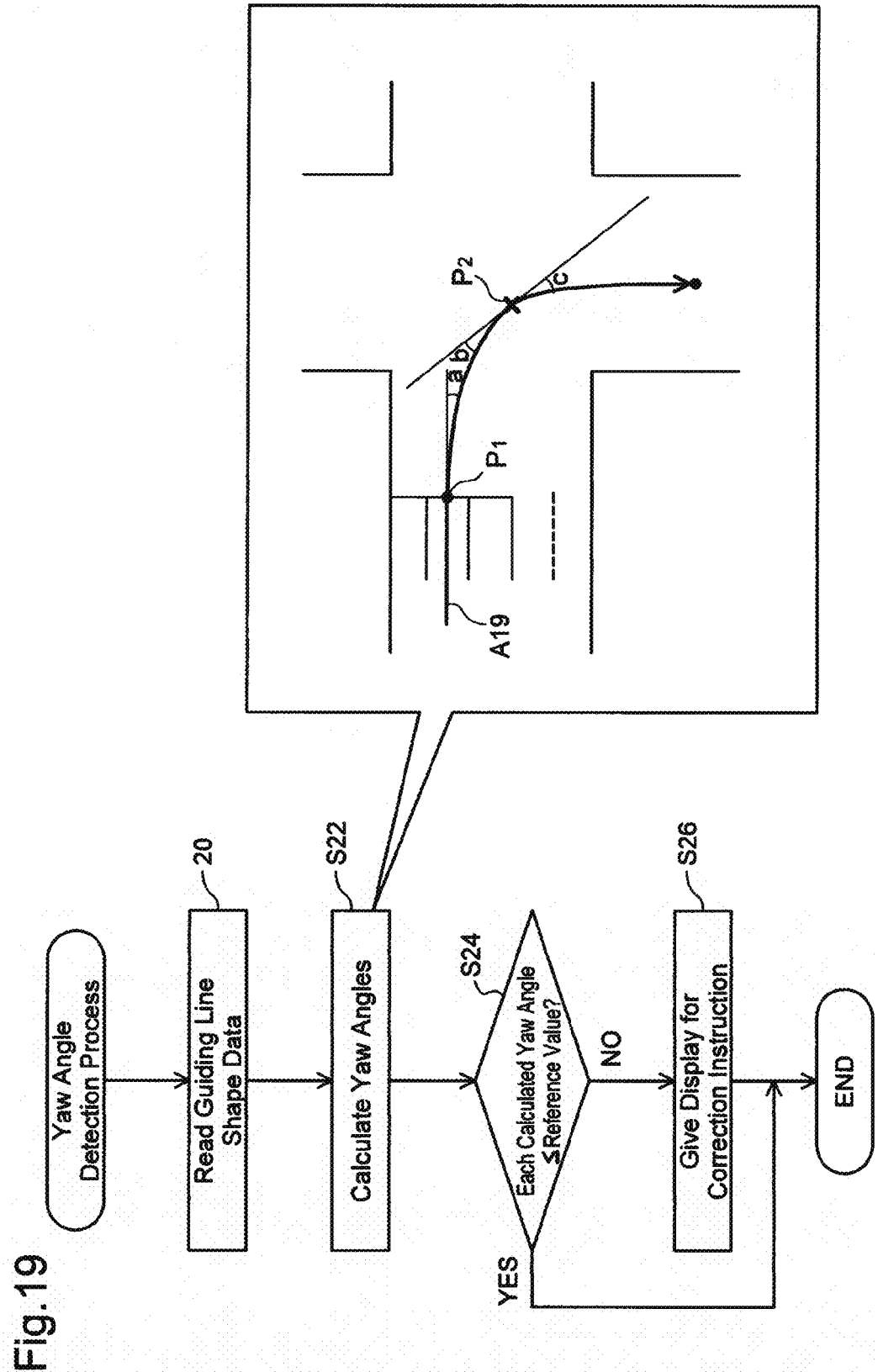
FIG. 19 is a flowchart showing a yaw angle detection process.

FIG. 19 is a flowchart showing a yaw angle detection process. The CPU of the computer configured as the generation support system performs this yaw angle detection process, which corresponds to the function of the yaw angle detection module 156 (FIG. 17).

At the start of the yaw angle detection process, the CPU reads the guiding line shape data (step S20) and calculates yaw angles with regard to each guiding line (step S22). One example of the calculated yaw angles with regard to a guiding line A19 set for a right turn in an intersection region is shown in a box on the right side of the flowchart. The yaw angles may be calculated for all the points on the guiding line A19. The process of this embodiment calculates the yaw angles for a starting point P1 of the guiding line A19 in the intersection region and a center point P2 of the guiding line A19 closest to the center of the intermediate region. The yaw angle may also be calculated for a terminal point of the guiding line A19.

The yaw angle represents a deflection angle of the direction of the guiding line. For example, the yaw angle calculated for the starting point P1 is an angle 'a' between a tangent vector at the starting point P1 and a tangent vector at a point shifted from the starting point P1 by a preset distance. The yaw angle calculated for the center point P2 is an angle 'c' between a tangent vector at the center point P2 and a tangent vector at a point shifted from the center point P2 by the preset distance. An angle 'b' between the tangent vector at the center point P2 and a tangent vector at a point shifted in an opposite direction from the center point P2 by the preset distance is also calculated for the center point P2.

The preset distance used in the calculation of the yaw angles may be any arbitrary value. For example, the distance may be set according to a sequence of points defining each guiding line. Namely the yaw angle 'a' may be calculated from the tangent vector at the starting point P1 and a tangent vector at a coordinate point next to the starting point P1.

The CPU subsequently compares the calculated yaw angles with a reference value (step S24) and gives a specific display for a correction instruction, when any of the calculated yaw angle is greater than the reference value (step S26). One typical example of the specific display is changing a display color of a certain portion of the guiding line A19 having the yaw angles exceeding the reference value. In response to the display for the correction instruction, the operator corrects the guiding line shape data. This sequence of processing desirably eliminates any unnatural guiding line with an abrupt change in direction.

C4. Simulation Process

Figure 20:
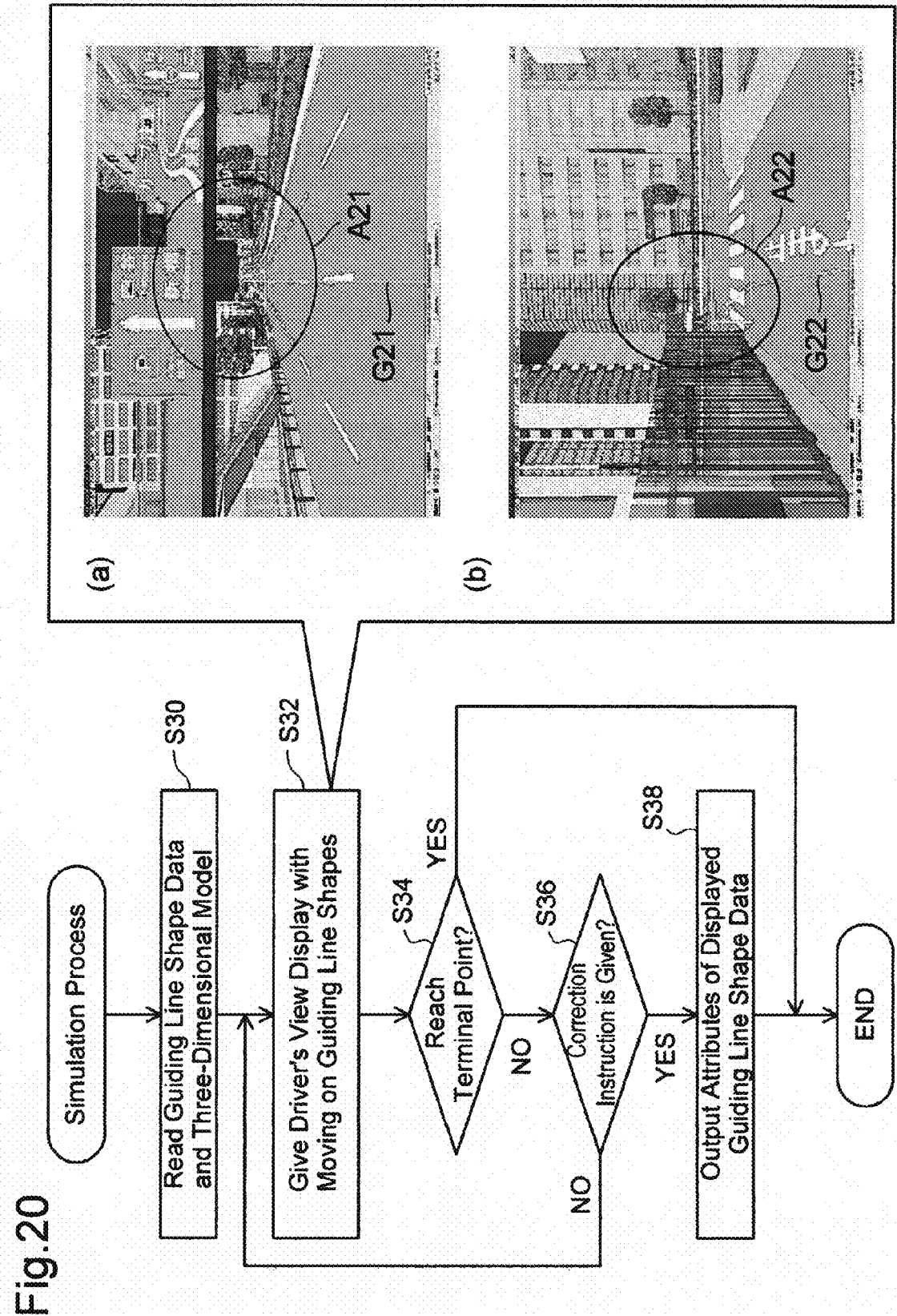
FIG. 20 is a flowchart showing a simulation process.

FIG. 20 is a flowchart showing a simulation process. The CPU of the computer configured as the generation support system performs this simulation process, which corresponds to the function of the simulation module 157 (FIG. 17).

At the start of the simulation process, the CPU reads the guiding line shape data and the three-dimensional model (step S30) and gives a guidance display in the driver's view with moving along guiding lines (step S32). This guidance display continues to a terminal point specified by the operator (step S34).

Examples of the guidance display are shown on the right side of the flowchart. In a guidance display 'a', a guiding line G21 passes under a pedestrian crossing bridge. This example of the guidance display has no inadequacy although the guiding line G21 crosses the pedestrian crossing bridge in an area A21 in a two-dimensional manner. In a guidance display b', a guiding line G22 turns left. The guiding line G22 is excessively close to a road sign in an area A22. Such simulation of the guidance display allows the operator to find any inadequacy, which can not be found in the process of setting the guiding line shape data on the two-dimensional map.

The operator inputs a correction instruction when finding any inadequacy as in the guidance display 'b'. In response to the operator's correction instruction, the CPU stops the guidance display (step S36) and outputs the attributes of the displayed guiding line shape data (step S38). In the example of the guidance display b', the CPU outputs a guiding line shape ID assigned to the guiding line G22 and the coordinates at a point corresponding to the area A22. The display on the screen may shift to a correction window for correcting the guiding line shape data, concurrently with output of such attributes.

This arrangement allows for easy detection of any inadequacy found in the simulation process and assures adequate correction of the guiding line shape data.

D. Route Guidance Process

A route guidance process discussed below utilizes the route guidance database of the embodiment. The outline of route guidance is explained with reference to an image drawing obtained by the combinational display of the two-dimensional road network, the three-dimensional road network and the guiding line shape data. The route guidance process is then explained with reference to a flowchart.

Figure 21:
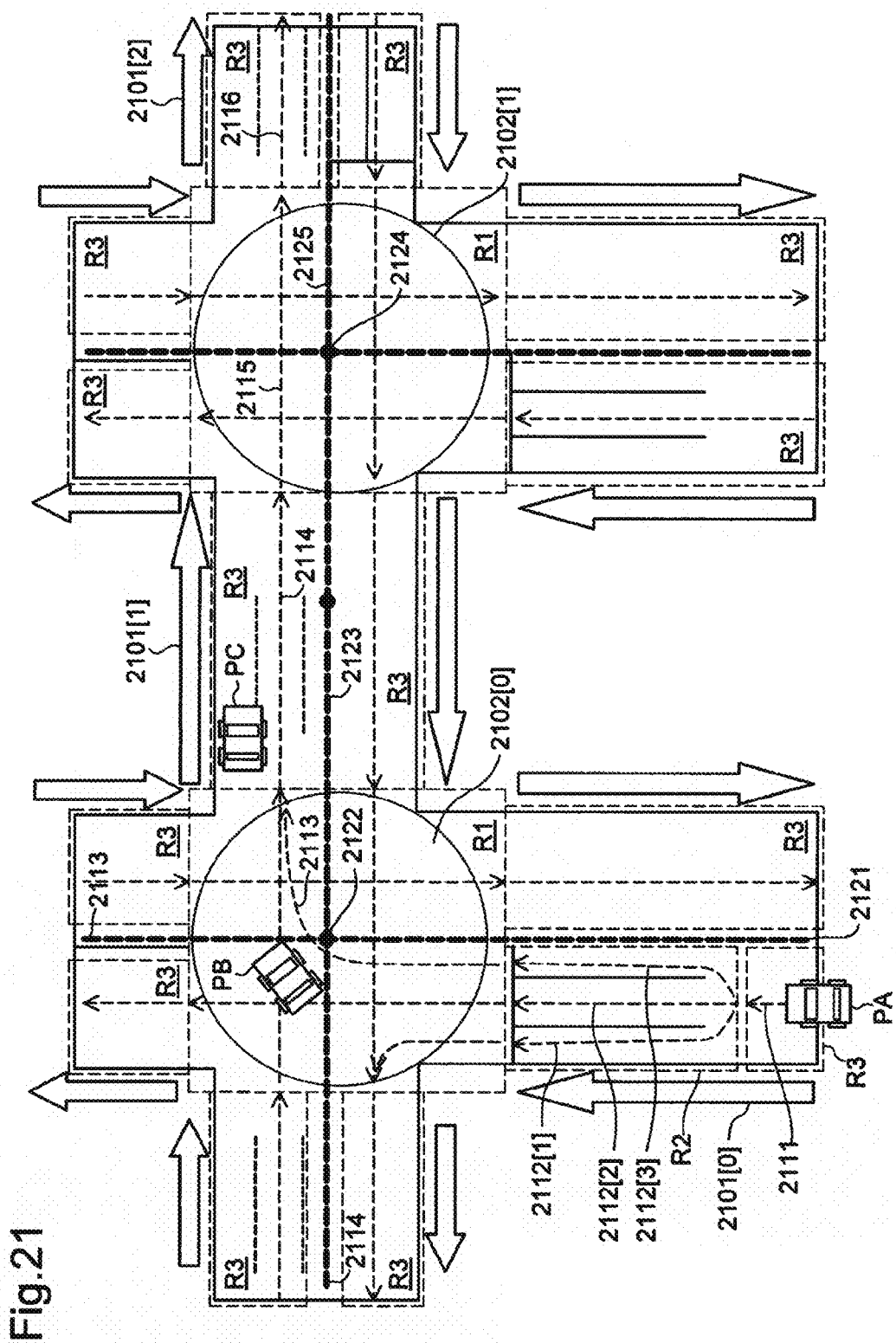
FIG. 21 is an explanatory view showing the outline of route guidance.

FIG. 21 is an explanatory view showing the outline of route guidance. Broken line rectangles respectively represent an intersection region R1, a connection region R2, and a route region R3. Thick broken lines represent PF links on the two-dimensional road network. Open arrows represent 3D links, and broken line circles represent 3D nodes. Thin arrows represent guiding lines.

The route search is assumed to give a route of 'PF link 2121→PF node 2122→PF link 2123→PF node 2124→PF link 2125'.

This route is expressed with 3D links and 3D nodes as '3D link 2101[0]→3D node 2102[0]→3D link 2101[1]→3D node 2102[1]→3D link 2101[2]'.

A guiding line used for guidance is selected for each region, based on the 3D links and the 3D nodes. A guiding line 2111 is selected for the route region R3 as a starting point PA. A guiding line 2112[3] for a lane change in preparation for a subsequent right turn is selected for the subsequent connection region R2 among three guiding lines 2112[1] through 2112[3]. A guiding line 2113 is selected for the intersection region R1 corresponding to the 3D node 2102[0] to guide a right turn PB. The guiding line 2113 approaches from the 3D link 2101[0] to the intersection region R1 and exits from the intersection region R1 to the 3D link 2101[1]. At a point PC after the right turn, a guiding line 2114 is selected for the 3D link 2101[1]. A guiding line 2115 is selected for the 3D node 2101[1] to approach from the 3D link 2101[1] and exit to the 3D link 2101[2]. After passage through the 3D node 2101[1], a guiding line 2116 is selected for the 3D link 2101[2].

The process of this embodiment specifies a combination of 3D links and 3D nodes based on a sequence of PF links and PF nodes given as a route search result and selects guiding lines for the respective regions according to the specification result. A guidance display is given with the selected guiding lines. The guidance display may be given in two-dimensional representation or may alternatively be given in three-dimensional representation since the guiding lines have three-dimensional shapes.

Figure 22:
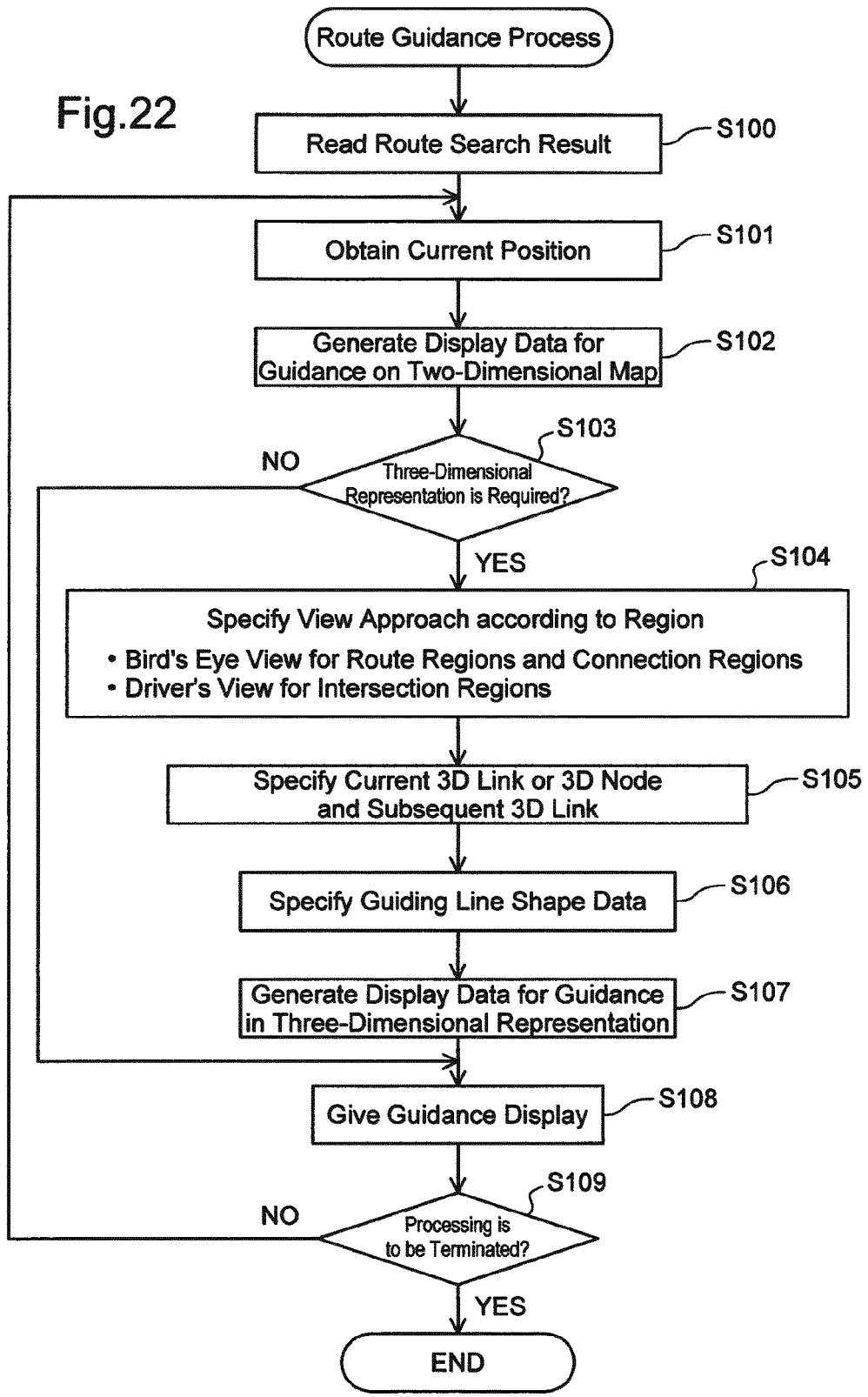
FIG. 22 is a flowchart showing a route guidance process.

FIG. 22 is a flowchart showing a route guidance process. The CPU of the route guidance device (FIG. 1) performs this route guidance process.

At the start of the route guidance process, the CPU reads a route search result (step S100). The route search result is given as a result of a route search based on the two-dimensional road network and indicates a searched route expressed by a sequence of PF links and PF nodes.

The CPU subsequently obtains the current location (step S101) and generates display data for a route guidance on a two-dimensional map (step S102). The current location is obtainable by the GPS. The display data for the route guidance on the two-dimensional map may be generated, based on the two-dimensional drawing data and the two-dimensional road network.

The CPU then determines whether the three-dimensional representation is required (step S103). The CPU determines the non-requirement for the three-dimensional representation, when the current location is in a non-available area without the three-dimensional model and the guiding line shape data or when the user's instruction specifies prohibition of the three-dimensional display.

Upon requirement for the three-dimensional representation, the CPU specifies the view approach of the three-dimensional representation according to the region (step S104). In this embodiment, the bird's eye view is adopted for route regions and connection regions, and the driver's view is adopted for intersection regions. The view approach may be set arbitrarily by the CPU or may be specified by the user. The process of this embodiment advantageously enables the view approach to be readily changed over according to the region without calculating the distance from the current location to a traffic intersection.

The CPU subsequently specifies a 3D link or a 3D node corresponding to the obtained current location and a subsequent 3D link to be passed after the current location (step S105). As discussed previously with reference to FIG. 6, the data of correlating 3D links and 3D nodes to PF links and PF nodes are stored as the 3D link correlation PF information and the 3D node correlation PF information in this embodiment. Namely the process of this embodiment refers to the 3D link correlation PF information and the 3D node correlation PF information to specify the 3D link or the 3D node corresponding to the current location and the subsequent 3D link, based on the sequence of PF links and PF nodes given as the route search result.

The CPU subsequently specifies guiding line shape data, based on the specification result of the current 3D link or 3D node and the subsequent 3D link to be passed (step S106). As discussed previously with reference to FIG. 10, the approach 3D link information and the exit 3D link information are set as the direction information group in relation to the guiding line shape data. Namely the database of the guiding line shape data is constructed to specify a guiding line based on the settings of an approach 3D link and an exit 3D link as the retrieval key. In a route region or a connection region, a guiding line is specified by setting a current 3D link corresponding to the current location to the approach 3D link and a subsequent 3D link to be passed to the exit 3D link. In an intersection region, on the other hand, a guiding line is specified by setting a previous 3D link passed before a current 3D node corresponding to the current location to the approach 3D link and a subsequent 3D link to be passed to the exit 3D link.

After specification of the guiding line shape data, the CPU refers to the three-dimensional model to generate display data for a route guidance in three-dimensional representation (step S107) and gives a guidance display (step S108). The guidance display may be given in various display modes. Upon non-requirement for the three-dimensional representation, a guidance display in two-dimensional representation may be shown on the overall display screen. Upon requirement for the three-dimensional representation, on the other hand, a guidance display in two-dimensional representation and a guidance display in three-dimensional representation may be shown in parallel on the display screen. Alternatively either the guidance display in two-dimensional representation or the guidance display in three-dimensional representation may be selected in response to the user's instruction.

The CPU repeats the above sequence of processing until the vehicle reaches a destination or until the user gives a stop instruction to stop the route guidance (step S109).

E. Effects

In the route guidance device of this embodiment, the route guidance data are provided in the form of a separate database from the route search database. This arrangement gives a route guidance display according to the actual passage behavior, without increasing the loading of a route search. The route guidance display facilitates the user's intuitive understanding of a searched route.

In this embodiment, the guiding line shape data used for the route guidance is correlated to the two-dimensional road network used for the route search via the three-dimensional road network provided as the intermediate data. The three-dimensional road network is constructed to include 3D links with directions and is used to show the moving direction on each road, which is not sufficiently expressible by the route search database. In the route search database, each traffic intersection is processible as one 3D node. This arrangement assures the simplified processing of a traffic intersection having the complex relations of multiple links and nodes. Using the three-dimensional road network as the intermediate data facilitates the relatively flexible correlation of the guiding line shape data to a searched sequence of PF nodes and PF links.

The process of the embodiment specifies the settings of the guiding line database with regard to the respective types of regions. This arrangement enables the display mode, for example, the view mode of a guidance display, to be adequately changed over for each region without calculating a distance from a traffic intersection to the current location.

The embodiment and its applications discussed above are to be considered in all aspects as illustrative and not restrictive. There may be many modifications, changes, and alterations without departing from the scope or spirit of the main characteristics of the present invention.

The technique of the invention enables a route guidance device to give an effective guidance display according to the actual passage behavior without adversely affecting a route search.

The invention claimed is:

1. A non-transitory computer-readable storage medium storing a route guidance database used to display a guiding line for guiding a moving body on a route as an object of route guidance, the route guidance database having a data structure configured to be referred to by a route guidance device to provide a guidance display for guiding a passage of the moving body on the route, wherein the route guidance device is configured to display a route for the moving body to take, by reading a route search result, detecting position coordinates of a current location of the moving body, and referring to the route search result based on the detected position coordinates, the route search result specifying a route to be guided with a combination of nodes and links representing a road and including position coordinates, the nodes and the links being contained in a route search database, the data structure comprising:
    guiding line shape data representing each guiding line along which the moving body on the route is guided; and
    relation information associated with the guiding line shape data, the relation information associating the guiding line shape data with the nodes and the links in the route search database,
wherein the relation information includes:
    an intermediate network including intermediate nodes and intermediate links provided separately from the guiding line shape data, and structured as simplified representation of the guiding line shape data;
    first relation data structured to show a correspondence between the nodes and the links in the route search database, and the intermediate nodes and the intermediate links in the intermediate network; and
    second relation data structured to show a correspondence between the guiding line shape data, and the intermediate nodes and the intermediate links in the intermediate network.

2. The computer-readable storage medium in accordance with claim 1, wherein each of the intermediate nodes is allowed to relate to multiple nodes in the route search database, and
    each of the intermediate links includes specific information indicating an available moving direction of the moving body.

3. The computer-readable storage medium in accordance with claim 1, the data structure further including combination data,
    wherein the combination data defines the guiding line from an entrance link to an exit link using a combination of multiple pieces of the guiding line shape data so as to pass through a plurality of intersections, wherein the entrance link is specified in the route search result as a route for entering an intersection, and the exit link is specified in the route search result as a route for exiting from the intersection.

4. The computer-readable storage medium in accordance with claim 1, wherein the guiding line shape data is provided with region information assigned thereto, the region information classifying regions based on a positional relation of the guiding line to an intersection, the classified regions including:
   an intersection region representing an inner area of the intersection;
   a connection region representing a specific area approaching the intersection; and
   a route region representing another area.

5. The computer-readable storage medium in accordance with claim 1, wherein the guiding line shape data is provided for a plurality of possible guiding lines from an entrance link to an exit link passing through an intersection, the entrance link and the exit link being specified, in the route search result, as a route for entering the intersection and as a route for exiting from the intersection, respectively.

6. The computer-readable storage medium in accordance with claim 5, wherein the guiding line shape data defines the guiding line to enter the intersection from a different entrance point depending on an angle between the entrance link and the exit link of the intersection.

7. The computer-readable storage medium in accordance with claim 6, wherein the guiding line shape data classifies passing directions through the intersection into three groups including straight, right turn, and left turn based on the angle, and assigns a specific entrance point to each of the three groups.

8. The computer-readable storage medium in accordance with claim 6, wherein the guiding line shape data includes data representing a connection trajectory connecting a moving trajectory of the moving body on a road to the entrance point in an area on the road approaching the intersection, and
   wherein the relation information associated with the guiding line shape data representing the connection trajectory includes data for specifying the entrance point.

9. The computer-readable storage medium in accordance with claim 5, wherein, for at least one intersection, the guiding line shape data provided for the plurality of possible guiding lines from the entrance link to the exit link through the intersection is provided for each of the guiding lines toward a different exit point depending on a respective route after exiting from the traffic intersection, and
   wherein the relation information for the at least one traffic intersection is structured to associate the guiding line shape data including data specifying the respective route after exiting from the traffic intersection with the nodes and the links in the route search database.

10. The computer-readable storage medium in accordance with claim 1, wherein the guiding line shape data is provided as a three-dimensional sequence of points including position information and height information.

11. The computer-readable storage medium in accordance with claim 1, wherein a yaw angle, which is calculated from the guiding line shape data as a change in a moving direction at each point along the guiding line, is not greater than an upper limit value determined according to a deflection ability of the moving body at an expected speed thereof when the moving body is being guided on the route.

12. An apparatus for supporting generation of a route guidance database, the route guidance database being used to display a guiding line for guiding a moving body on a route as an object of route guidance,
   the route guidance database being configured to be referred to by a route guidance device to provide a guidance display for guiding a passage of the moving body on the route, wherein the route guidance device is configured to display a route for the moving body to take, by reading a route search result, detecting position coordinates of a current location of the moving body, and referring to the route search result based on the detected position coordinates, the route search result specifying a route to be guided with a combination of nodes and links representing a road and including position coordinates, the nodes and the links being contained in a route search database and representing,
   the route guidance database including:
      guiding line shape data representing each guiding line along which the moving body on the route is guided; and
      relation information associated with the guiding line shape data, the relation information associating the guiding line shape data with the nodes and the links in the route search database,
   wherein the relation information includes:
      an intermediate network including intermediate nodes and intermediate links provided separately from the guiding line shape data, and structured as simplified representation of the guiding line shape data;
      first relation data structured to show a correspondence between the nodes and the links in the route search database, and the intermediate nodes and the intermediate links in the intermediate network; and
      second relation data structured to show a correspondence between the guiding line shape data and the intermediate nodes and the intermediate links in the intermediate network,
   the apparatus comprising:
      a map data reference section configured to refer to three-dimensional map data for displaying a three-dimensional map including features expressed in a three-dimensional representation;
      a route guidance data reference section configured to refer to the route guidance database being generated;
      a display controller configured to display the three-dimensional map viewed from the moving body based on the three-dimensional map data, and to display the guiding line based on the route guidance database;
      a command input section configured to receive an operator's command as to whether correction of the route guidance database is necessary with respect to the displayed three-dimensional map and the displayed guiding line; and
      a correction controller configured to, if a correction command is received, switch to a correction window for correcting the route guidance database, or output information for specifying a portion corresponding to the correction command from among the route guidance database.

13. The apparatus in accordance with claim 12, the generation support system further including:
   a yaw angle detection section configured to determine whether a yaw angle, which is calculated from the guiding line shape data as a change in a moving direction at each point along the guiding line, is not greater than an upper limit value determined according to a deflection ability of the moving body at an expected speed thereof when the moving body is being guided on the route.

14. A route guidance device for displaying a guiding line for guiding a moving body on a route as an object of route guidance, the route guidance device comprising:

a map data reference section configured to refer to three-dimensional map data for displaying a three-dimensional map including features expressed in a three-dimensional representation;

a route search result storage section that stores a route search result, the route search result specifying a route to be guided with a combination of nodes and links representing a road and including position coordinates, the nodes and the links being contained in a route search database;

a route guidance database storage section that stores a route guidance database for the route guidance, the route guidance database including:

guiding line shape data representing each guiding line along which the moving body on the route is guided; and relation information associated with the guiding line shape data, the relation information associating the guiding line shape data with the nodes and the links in the route search database, wherein the relation information includes:

an intermediate network including intermediate nodes and intermediate links provided separately from the guiding line shape data, and structured as simplified representation of the guiding line shape data;

first relation data structured to show a correspondence between the nodes and the links in the route search database, and the intermediate nodes and the intermediate links in the intermediate network; and second relation data structured to show a correspondence between the guiding line shape data, and the intermediate nodes and the intermediate links in the intermediate network;

a current location detection section configured to detect position coordinates of a current location of the moving body; and a display controller configured to determine a route to be taken by the moving body by referring to the route search result based on the detected position coordinates of the current location of the moving body, to specify the guiding line shape data corresponding to the determined route by referring to the relation information, and to provide a guidance display in a three-dimensional representation for guiding the moving body on the route, based on the three-dimensional map data and the specified guiding line shape data.

15. The route guidance device in accordance with claim 14, wherein the guiding line shape data is provided with region information assigned thereto, the region information classifying regions based on a positional relation of the guiding line to an intersection, the classified regions including:

an intersection region representing an inner area of the intersection;

a connection region representing a specific area approaching the intersection; and a route region representing another area.

\* \* \* \* \*